(12) United States Patent
Hattori

(10) Patent No.: US 12,712,976 B2
(45) Date of Patent: Aug. 18, 2026

(54) MEDIA CONVEYING APPARATUS, IMAGE PROCESSING SYSTEM, AND MEDIA CONVEYING METHOD

(71) Applicant: PFU LIMITED, Kahoku (JP)

(72) Inventor: Katsuhiro Hattori, Kahoku (JP)

(73) Assignee: PFU LIMITED, Kahoku (JP)

( * ) Notice: Subject to any disclaimer, the term of this patent is extended or adjusted under 35 U.S.C. 154(b) by 300 days.

(21) Appl. No.: 18/645,711

(22) Filed: Apr. 25, 2024

(65) Prior Publication Data

US 2024/0364826 A1 Oct. 31, 2024

(30) Foreign Application Priority Data

Apr. 28, 2023 (JP) ................................ 2023-074932

(51) Int. Cl.
*H04N 1/00* (2006.01)
*H04N 1/32* (2006.01)

(52) U.S. Cl.
CPC ..... *H04N 1/00822* (2013.01); *H04N 1/00588* (2013.01); *H04N 1/32641* (2013.01); *H04N 1/32657* (2013.01)

(58) Field of Classification Search
CPC ........... H04N 1/00822; H04N 1/00588; H04N 1/32641; H04N 1/32657; H04N 1/00801; H04N 1/00803; H04N 1/00806; H04N 1/00811; H04N 1/00684–00726; H04N 1/00875; H04N 1/00777; H04N 1/00716; H04N 1/00769
See application file for complete search history.

(56) References Cited

U.S. PATENT DOCUMENTS

2006/0012837 A1 1/2006 Ishikawa
2012/0206776 A1 * 8/2012 Sato ..................... G06F 3/1218 358/465

FOREIGN PATENT DOCUMENTS

JP 4544926 B2 9/2010
JP 2011-66762 A 3/2011

* cited by examiner

*Primary Examiner* — Christopher Wait
(74) *Attorney, Agent, or Firm* — Womble Bond Dickinson (US) LLP

(57) ABSTRACT

A media conveying apparatus includes circuitry configured to set setting information regarding an input image generation process, a conveyor to convey a plurality of media sequentially, and an imager to image each of the plurality of media sequentially conveyed by the conveyor according to the setting information to obtain an input image. The circuitry determines, based on the input image, whether the setting information is compatible with the medium imaged in the input image; and calculates a degree of the number of media for which the setting information is determined to be incompatible among the plurality of media. When the degree is greater than a threshold, the circuitry stops conveying subsequent media and outputs information on a result of determining whether the setting information is compatible with the medium imaged in the input image.

8 Claims, 13 Drawing Sheets

| MEDIA NUMBER | INPUT IMAGE | PROCESSED IMAGE | DETERMINATION RESULT |
|---|---|---|---|
| 1 | U0001.jpg | V0001.jpg | COMPATIBLE |
| 2 | U0002.jpg | V0002.jpg | INCOMPATIBLE |
| ... | ... | ... | ... |

FIG. 6

| ITEM | SETTING VALUE |
|---|---|
| RESOLUTION | 150dpi/200dpi/300dpi/600dpi/1200dpi/… |
| MEDIA SIZE | BUSINESS CARD SIZE/LETTER SIZE/ … /A4 SIZE/A3 SIZE |
| COLOR | BINARY VALUE/GRAY SCALE/COLOR |
| BACKGROUND COLOR | WHITE/BLACK |
| … | … |

FIRST PROCESSING CIRCUIT
340
DETERMINATION CIRCUIT
343
CALCULATION CIRCUIT
344
IDENTIFYING CIRCUIT
345
CONTROL CIRCUIT
341
ACQUISITION CIRCUIT
346
SETTING CIRCUIT
342
RECEPTION CIRCUIT
348
NOTIFICATION CIRCUIT
347
FIRST STORAGE DEVICE
130
FIRST DISPLAY DEVICE
106
FIRST MEDIA SENSOR
111
SECOND MEDIA SENSOR
116
MOTOR
121
IMAGING DEVICE
117
FIRST COMMUNICATION DEVICE
122
FIRST INPUT DEVICE
105

MEDIA CONVEYING APPARATUS, IMAGE PROCESSING SYSTEM, AND MEDIA CONVEYING METHOD

CROSS-REFERENCE TO RELATED APPLICATIONS

This patent application is based on and claims priority pursuant to 35 U.S.C. § 119 (a) to Japanese Patent Application No. 2023-074932, filed on Apr. 28, 2023, in the Japan Patent Office, the entire disclosure of which is hereby incorporated by reference herein.

BACKGROUND

The present disclosure relates to a media conveying apparatus, an image processing system, and a media conveying method.

Currently, media conveying apparatuses such as a scanner, which scans a plurality of media to generate images while sequentially conveying the media, have been used for imaging of various types of media in a wide variety of applications. The image quality required of such a media conveying apparatus differs depending on, for example, its purpose and the type of media to be read. In general, in the media conveying apparatus, various setting information regarding imaging processing of the media or image processing, such as resolution or color, can be set in order to generate an appropriate image according to, for example, the application or type of media. However, if erroneous setting information is set, the user needs to conduct conveying and imaging again of a medium whose image has been generated according to the erroneous setting information.

In some cases, an abnormality occurs after reading of a document is started, and reading of information of the document is interrupted. There is a known document reading device that prompts a user to place, on a media receptacle, a bundle of documents including a document whose information has been read before such an interruption. This document reading device increases the speed of conveyance of the document whose information has already been read from the speed of conveyance of the subsequent documents whose reading has been interrupted.

SUMMARY

In one aspect, a media conveying apparatus includes circuitry configured to set setting information regarding an input image generation process, a conveyor to convey a plurality of media sequentially, and an imager to image each of the plurality of media sequentially conveyed by the conveyor according to the setting information to obtain an input image. The circuitry determines, based on the input image, whether the setting information is compatible with the medium imaged in the input image; and calculates a degree of the number of media for which the setting information is determined to be incompatible among the plurality of media. When the degree is greater than a threshold, the circuitry stops conveying subsequent media and outputs information on a result of determining whether the setting information is compatible with the medium imaged in the input image.

In another aspect, an image processing system including a media conveying apparatus and an information processing apparatus includes circuitry, a conveyor, and an imager. The circuitry sets setting information regarding an input image generation process. The conveyor conveys a plurality of media sequentially. The imager images each of the plurality of media sequentially conveyed by the conveyor according to the setting information to obtain an input image. Further, the circuitry determines, based on the input image, whether the setting information is compatible with the medium imaged in the input image; and calculates a degree of the number of media for which the setting information is determined to be incompatible among the plurality of media. When the degree is greater than a threshold, the circuitry stops conveying subsequent media and outputs information on a result of determining whether the setting information is compatible with the medium imaged in the input image.

In another aspect, a media conveying method includes setting setting information regarding an input image generation process; conveying a plurality of media sequentially by a conveyor; imaging, with an imager, each of the plurality of media sequentially conveyed according to the setting information to obtain an input image; determining, based on the input image, whether the setting information is compatible with the medium imaged in the input image; calculating a degree of the number of media for which the setting information is determined to be incompatible among the plurality of media; stopping conveying subsequent media when the degree is greater than a threshold; and outputting information on a result of determining whether the setting information is compatible with the medium imaged in the input image when the degree is greater than the threshold.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is a schematic diagram illustrating setting information according to an embodiment;

Figure 1:
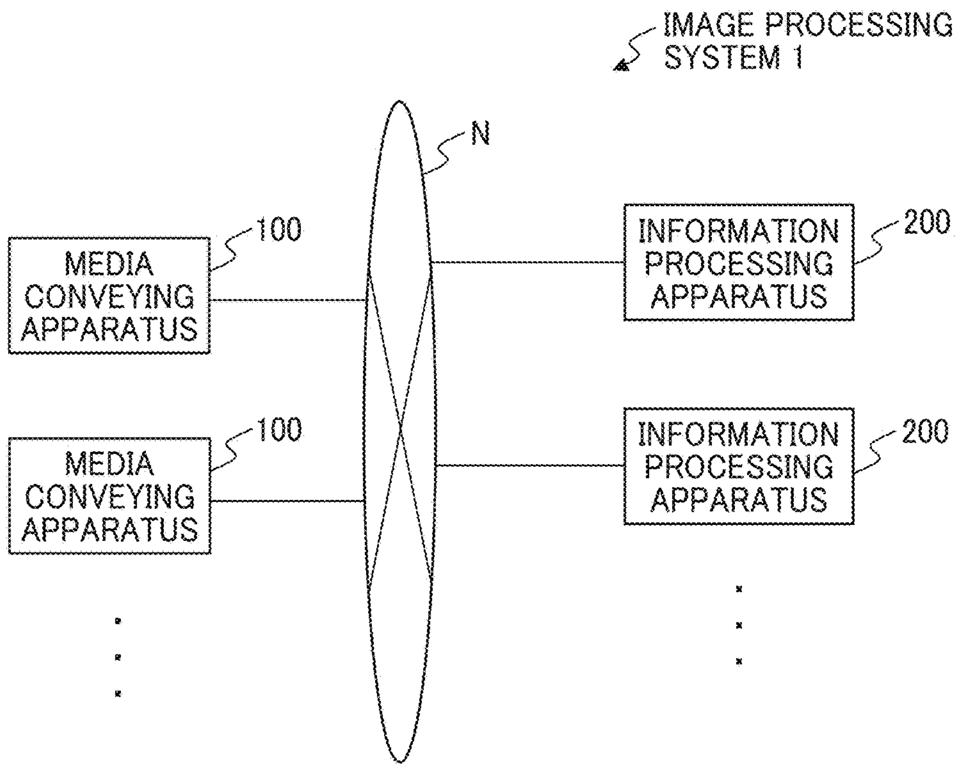
FIG. 1 is a diagram illustrating a schematic configuration of an image processing system according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of a media conveying apparatus, an image processing system, a media conveying method, and a control program according to embodiments of the present disclosure with reference to the drawings. The embodiments described below are illustrative and do not limit the present disclosure. Thus, numerous additional modifications and variations are possible in light of the above teachings. For example, elements and/or features of different illustrative embodiments may be combined with each other and/or substituted for each other within the scope of the present invention.

FIG. 1 is a diagram illustrating a schematic configuration of an image processing system 1 according to an embodiment.

As illustrated in FIG. 1, the image processing system 1 includes one or a plurality of media conveying apparatuses 100 and one or a plurality of information processing apparatuses 200. The media conveying apparatus 100 and the information processing apparatus 200 are communicatively connected to each other via a network N. The network N is, for example, the Internet or an intranet.

The media conveying apparatus 100 is an Auto Document Feeder (ADF) type scanner device that images a medium such as a document while conveying the media, for example. The media are, for example, sheets of plain paper, sheets of thin paper, sheets of thick paper, or cards. The media include various types of media such as receipts, business cards, invoices, and delivery notes. Alternatively, the media conveying apparatus 100 may be, for example, a facsimile machine, a copier, or a multifunction peripheral (MFP).

The information processing apparatus 200 is, for example, a personal computer, a notebook personal computer, a tablet computer, or a smartphone. The information processing apparatus 200 may be a server provided in a cloud network.

Figure 2:
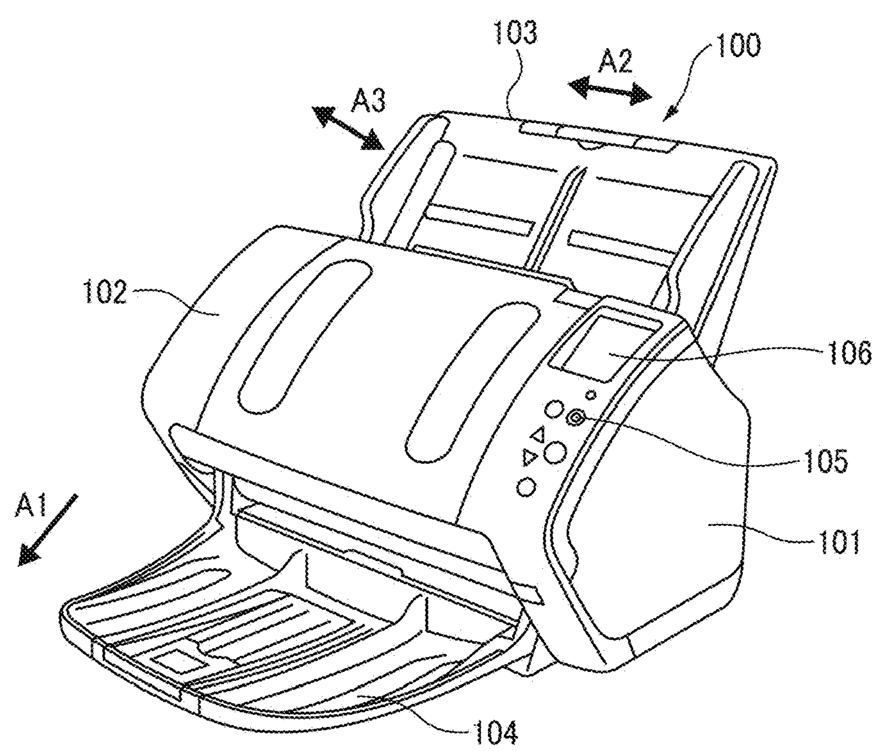
FIG. 2 is a perspective view of the media conveying apparatus according to an embodiment.

FIG. 2 is a perspective view of the media conveying apparatus 100 according to the present embodiment.

The media conveying apparatus 100 includes a lower housing 101, an upper housing 102, a receptacle 103, a discharge table 104, a first input device 105, and a first display device 106.

The upper housing 102 is disposed at a position covering the upper surface of the media conveying apparatus 100, and is engaged with the lower housing 101 via a hinge so that upper housing 102 can be opened and closed at the time of jamming a medium or clearing of the inside of the media conveying apparatus 100.

The receptacle 103 is engaged with the lower housing 101 such that the media to be conveyed can be placed on the receptacle 103. The discharge table 104 is engaged with the lower housing 101 such that the media discharged from the discharge port can be placed on the discharge table 104.

The first input device 105 includes an input device such as buttons and an interface circuit that acquires signals from the input device. The first input device 105 receives an input operation performed by a user and outputs an operation signal corresponding to the input operation performed by the user. The first display device 106 includes a display having liquid crystal organic EL (Electro-Luminescence), and etc., and an interface circuit that outputs image data to the display, to display the image data on the display.

In FIG. 2, an arrow A1 indicates the media conveying direction, an arrow A2 indicates the width direction perpendicular to the media conveying direction, and an arrow A3 indicates the height direction perpendicular to the media conveying direction and the width direction. In the following, upstream is upstream in the media conveying direction A1, and downstream is downstream in the media conveying direction A1.

Figure 3:
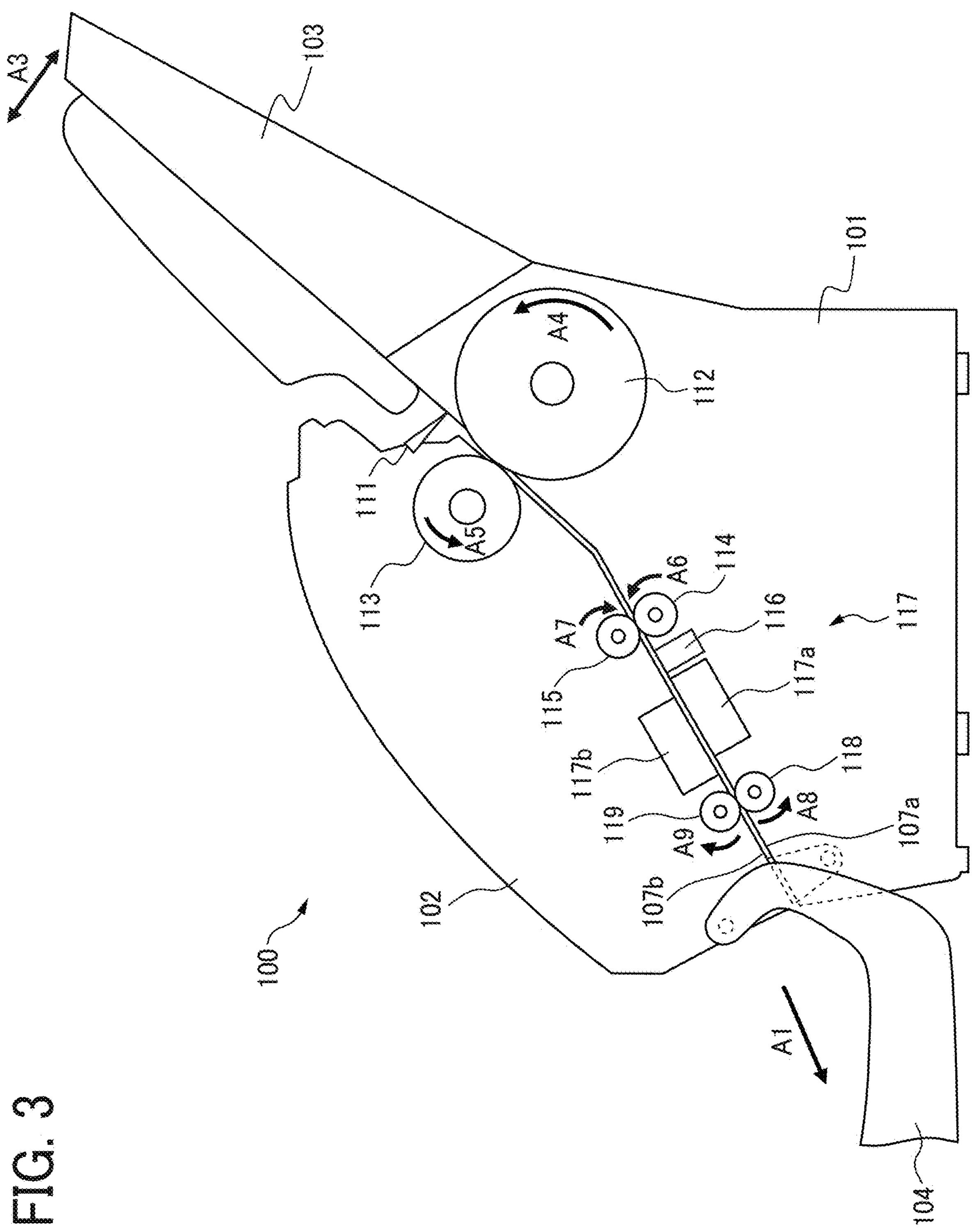
FIG. 3 is a diagram illustrating a conveyance passage inside the media conveying apparatus of FIG. 2.

FIG. 3 is a diagram illustrating a conveyance passage inside the media conveying apparatus 100 according to the present embodiment.

The conveyance passage inside the media conveying apparatus 100 includes a first media sensor 111, a feeding roller 112, a separation roller 113, a first conveyance roller 114, a second conveyance roller 115, a second media sensor 116, an imaging device 117, and a third conveyance roller 118, a fourth conveyance roller 119, and the like. The number of each roller is not limited to one, and the number of each roller may be plural, respectively. In such a case, each roller is disposed side by side at intervals in the width direction A2, respectively. The feeding roller 112, the separation roller 113, the first conveyance roller 114, the second conveyance roller 115, the third conveyance roller 118, and the fourth conveyance roller 119 are examples of a conveyor, and sequentially convey a plurality of media.

The media conveying apparatus 100 has a so-called straight path. The upper surface of the lower housing 101 forms a lower guide 107*a* for the media conveying path, and the lower surface of the upper housing 102 forms an upper guide 107*b* for the media conveying path.

The first media sensor 111 is disposed upstream from the feeding roller 112 and the separation roller 113. The first media sensor 111 includes a contact detection sensor and detects whether a medium is placed on the receptacle 103. The first media sensor 111 generates and outputs a first media signal whose signal value changes depending on whether a medium is placed on the receptacle 103. The first media sensor 111 is not limited to a contact detection sensor. The first media sensor 111 may be any other sensor such as an optical detection sensor having the capability of detecting the presence of a medium.

The feeding roller 112 is provided in the lower housing 101 and sequentially feeds the media placed on the receptacle 103 from the bottom. The separation roller 113 is a so-called brake roller or retard roller, and is provided in the upper housing 102 and is disposed opposite to the feeding roller 112. The feeding roller 112 and the separation roller 113 function as a separation unit that separates the media.

The first conveyance roller 114 and the second conveyance roller 115 are disposed downstream from the feeding roller 112 and the separation roller 113 and is opposite to each other, and conveys the media fed by the feeding roller 112 and the separation roller 113 to the imaging device 117.

The second media sensor 116 is disposed downstream from the first conveyance roller 114 and the second conveyance roller 115 and upstream from the imaging device 117, and detects the media conveyed to that position. The second media sensor 116 includes a light emitter and a light receiver provided on one side with respect to the media conveying path (for example, the lower housing 101), and a light guide tube provided on a position opposite to the light emitter and the light receiver with the media conveying path in between (for example, the upper housing 102). The light emitter is a light emitting diode (LED) or the like, and emits light toward the media conveying path. By contrast, the light receiver is, for example, a photodiode and receives the light that is emitted by the light emitter and guided by the light guide tube. When the medium is present at a position opposite to the second media sensor 116, the light emitted from the light emitter is blocked by the media, and therefore the light receiver does not detect the light emitted from the light emitter. Based on the intensity of the light received, the light receiver generates and outputs a second media signal whose signal value changes between states in which the medium exists and does not exist at the position of the second media sensor 116.

A reflective member such as a mirror may be used instead of the light guide tube. Further, the light emitter and the light receiver may be provided opposite to each other with the media conveying path in between. Further, the second media sensor 116 may detect the medium using a contact detection sensor or the like that flows a predetermined current when the medium is in contact or not in contact therewith.

The imaging device 117 is an example of an imager. The imaging device 117 is disposed downstream from the first conveyance roller 114 and the second conveyance roller 115 and upstream from the third conveyance roller 118 and the fourth conveyance roller 119. The imaging device 117 includes a first imaging device 117*a* and a second imaging device 117*b*. The first imaging device 117*a* and the second imaging device 117*b* are disposed near the media conveying path and opposite to each other with the conveying path in between.

The first imaging device 117*a* includes a light source and a contact image sensor (CIS) line sensor. The CIS line sensor employs an equal-magnification optical system and includes complementary metal oxide semiconductor (CMOS) imaging elements aligned linearly in the main-scanning direction.

The first imaging device 117*a* further includes a lens that forms an image on the imaging elements and an analog-to-digital (A/D) converter. The A/D converter amplifies the electric signals output from the imaging elements and performs analog-to-digital (A/D) conversion. The first imaging device 117*a* obtains an input image by imaging the front side of each of the media sequentially conveyed by the conveyor, and outputs the input image.

Similarly, the second imaging device 117*b* includes a light source and a CIS line sensor employing the equal-magnification optical system and including CMOS imaging elements aligned linearly in the main-scanning direction. The second imaging device 117*b* further includes a lens that forms an image on the imaging elements and an A/D converter. The A/D converter amplifies the electric signals output from the imaging elements and performs A/D conversion. The second imaging device 117*b* obtains an input image by imaging the back side of each of the media sequentially conveyed by the conveyor, and outputs the input image.

Alternatively, the media conveying apparatus 100 may include either the first imaging device 117*a* or the second imaging device 117*b* to read only one side of the media. The CIS line sensor may, instead of the CIS line sensor employing the equal-magnification optical system and including CMOS imaging element, employ the equal-magnification optical system and includes charge-coupled devices (CCD) imaging elements. Alternatively, a line sensor employing a reduction optical system and including a CMOS or CCD imaging element may be used.

Further, the first imaging device 117*a* has a backing provided at a position opposite to the line sensor of the second imaging device 117*b* with the media conveying path in between. The second imaging device 117*b* has a backing provided at a position opposite to the line sensor of the first imaging device 117*a* with the media conveying path in between. Each backing has an opposing surface that is opposite to each line sensor. The opposing surface of each backing has, for example, a white color. Each backing functions as a white reference for image correction such as shading based on an image signal obtained by imaging an image of the opposing surface. Each backing is movable between an opposing position where each opposing surface is opposite to each line sensor and a non-opposing position where each opposing surface is deviated from the opposing position. When an image is generated in a state where the backing is disposed in the opposing position, the background area where the medium is absent includes the backing, and pixels within that area have a white color. By contrast, the background area of the image generated in a state where the backing is disposed in the non-opposing position includes their respective bottom surfaces (walls) of the imaging devices, and pixels within that area have a black color.

The third conveyance roller 118 and the fourth conveyance roller 119 are disposed downstream from the imaging device 117 and opposite to each other, and discharge the media conveyed by the first conveyance roller 114 and the second conveyance roller 115 onto the discharge table 104.

The media placed on the receptacle 103 are conveyed between the lower guide 107*a* and the upper guide 107*b* in the media conveying direction A1 by the feeding roller 112 rotating in the direction of the arrow A4 in FIG. 3. The separation roller 113 rotates or stops in the direction of the arrow A5 in FIG. 3 when conveying the media. Due to the action of the feeding roller 112 and separation roller 113, when a plurality of media is placed on the receptacle 103, only the medium in contact with the feeding roller 112 among the media placed on the receptacle 103 is separated. This prevents the conveying of the media other than the separated media. In short, the multiple feeding is prevented.

The medium is fed between the first conveyance roller 114 and the second conveyance roller 115 while being guided by the lower guide 107*a* and the upper guide 107*b*. The medium is fed between the first imaging device 117*a* and the second imaging device 117*b* by the first conveyance roller 114 rotating in the direction of the arrow A6 in FIG. 3 and the second conveyance roller 115 rotating in the direction of the arrow A7 in FIG. 3. The media read by the imaging device 117 are discharged onto the discharge table 104 by the third conveyance roller 118 rotating in the direction of the arrow A8 in FIG. 3 and the fourth conveyance roller 119 rotating in the direction of the arrow A9 in FIG. 3.

Figures 4, 5:
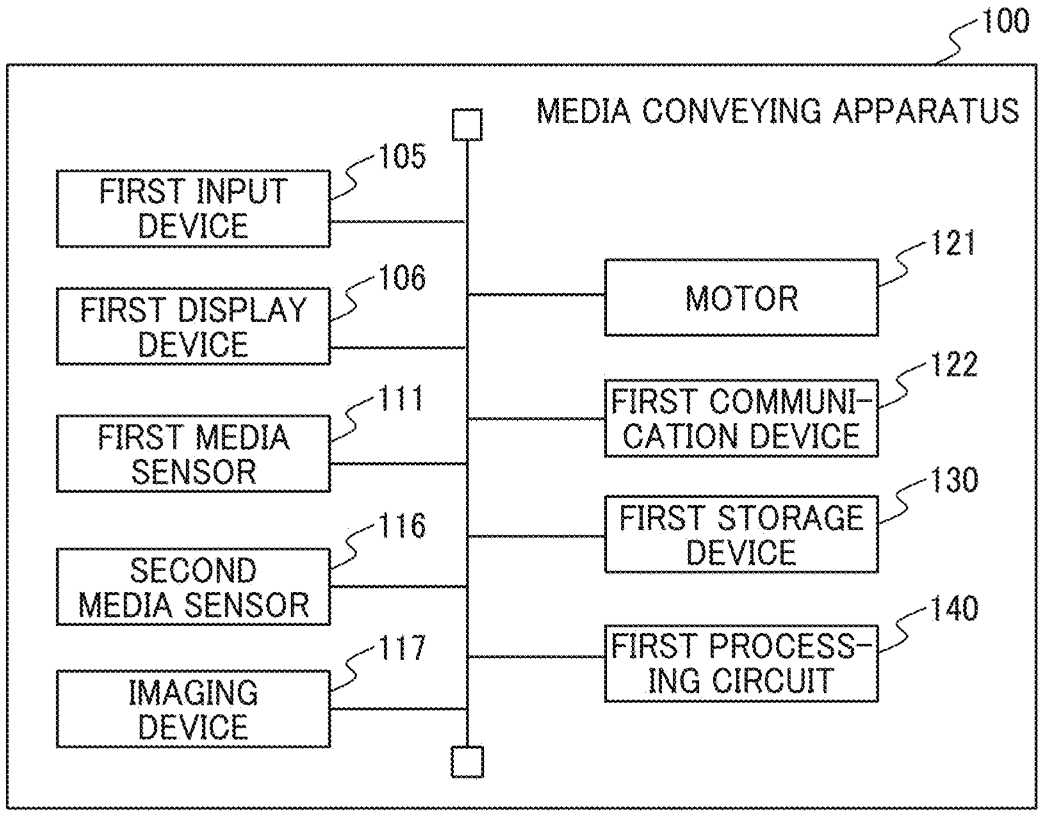
FIG. 4 is a schematic block diagram illustrating a configuration of the media conveying apparatus of FIG. 2.
FIG. 5 is a schematic diagram illustrating a data structure of a result table according to an embodiment.

FIG. 4 is a schematic block diagram illustrating a configuration of the media conveying apparatus 100 according to the present embodiment.

In addition to the configuration described above, the media conveying apparatus 100 includes a motor 121, a first communication device 122, a first storage device 130, a first processing circuit 140, and the like.

The motor 121 includes one or a plurality of motors. The motor 121 rotates the feeding roller 112, the separation roller 113, the first conveyance roller 114, the second conveyance roller 115, the third conveyance roller 118, and the fourth conveyance roller 119 in response to a control signal from the first processing circuit 140 to perform the conveyance operation of the media. One of the first conveyance roller 114 and the second conveyance roller 115 may be a driven roller that rotates following the other roller. Furthermore, one of the third conveyance roller 118 and the fourth conveyance roller 119 may be a driven roller that rotates following the other roller.

The first communication device 122 includes an antenna that transmits and receives wireless signals, and a wireless communication interface circuit for transmitting and receiving signals through a wireless communication line according to a communication protocol such as a wireless local area network (LAN) protocol. The first communication device 122 communicates with the information processing apparatus 200, and according to an instruction from the first processing circuit 140, is communicatively connected to the information processing apparatus 200 to transmit and receive various images and information. The first communication device 122 may include a wired communication interface circuit supporting a communication protocol such as the Transmission Control Protocol/Internet Protocol (TCP/IP), and may be connected to the information processing apparatus 200 via a network. The first communication device 122 may have an interface circuit compatible with a serial bus such as the Universal Serial Bus (USB) and may be connected to the information processing apparatus 200 via a wired cable such as a USB cable.

The first storage device 130 includes memories such as a random-access memory (RAM) and a read-only memory (ROM); a fixed disk device such as a hard disk; or a portable memory such as a flexible disk or an optical disk. The first storage device 130 stores, for example, computer programs, databases, and tables used for various processes performed by the media conveying apparatus 100. The computer programs may be installed in the first storage device 130 using a known setup program or the like from a computer-readable portable recording medium. The portable recording medium is, for example, the compact disc read only memory (CD-ROM), the digital versatile disc read only memory (DVD-ROM), and so on. Further, the computer program may be distributed from a server or the like and installed in the first storage device 130. Furthermore, the first storage device 130 stores a result table as data. Details of the result table is described later.

The first processing circuit 140 operates according to a program stored in the first storage device 130 in advance. The first processing circuit 140 is, for example, a central processing unit (CPU). Alternatively, as the first processing circuit 140, for example, a digital signal processor (DSP), a large scale integration (LSI), an application-specific integrated circuit (ASIC), or a field-programmable gate array (FPGA) may be used.

The first processing circuit 140 is connected to the first input device 105, the first display device 106, the first media sensor 111, the second media sensor 116, the imaging device 117, the motor 121, the first communication device 122, the first storage device 130, and the like, and controls each of these units. The first processing circuit 140 sets setting information regarding an input image generation process designated by the user via the first input device 105 or the first communication device 122. The setting information regarding the input image generation process is information regarding at least one of imaging processing and image processing. The first processing circuit 140 performs drive control of the motor 121, imaging control of the imaging device 117, and the like, according to the set setting information, and acquires an input image. The first processing circuit 140 also determines whether the setting information is compatible with the medium imaged in the input image (an image of the medium included in the input image). Further, when the degree of the number of media for which the setting information is determined to be incompatible is greater than a threshold, the first processing circuit 140 stops conveying subsequent media and notifies the user of the stop. In this disclosure, the expression like "setting information is compatible with a medium" is synonymous with the expression like "setting information matches a medium."

FIG. 5 is a schematic diagram illustrating a data structure of the result table according to the present embodiment.

As illustrated in FIG. 5, in the result table, information such as the media number, the input image, the processed image, and the determination result are stored in association with each other for each medium conveyed by the media conveying apparatus 100. The media number is a number for identifying the medium to be conveyed, and indicates the order in which each medium is conveyed among a bundle of media placed on the receptacle 103 and conveyed in sequence.

The input image is an image of the medium captured according to the setting information. The processed image is an image generated by performing image processing on the input image according to the setting information. The determination result indicates "compatible" or "not compatible" as a result of determining whether the setting information is compatible with the medium imaged in the input image. The items corresponding to each medium in the result table are initialized at the start of the media reading and is added or updated each time the medium is conveyed.

FIG. 6 is a schematic diagram illustrating the setting information according to the present embodiment.

As illustrated in FIG. 6, the setting information is information on imaging processing or image processing, and is information for specifying, for example, content of the operation of the media conveying apparatus 100 for imaging the media or image processing to be executed on the obtained images. Items specified by the setting information include resolution, media size, color, and background color.

Resolution, media size, color, background color, and the like, are settings regarding imaging processing. Further, resolution, media size, color, and the like, are settings regarding image processing.

The resolution is the setting of the resolution of the image to be generated, and the setting value of the resolution is, for example, 150 dpi (Dots Per Inch), 200 dpi, 300 dpi, 600 dpi, or 1200 dpi. The media conveying apparatus 100 can generate the image with a set resolution by setting imaging processing conditions including the media conveying speed, the imaging timing (time interval) of the imaging device 117, and the positions of the imaging elements in the line sensor to be used. Further, the media conveying apparatus 100 can generate an image with the set resolution by executing, in the image processing, thinning or interpolation of the image generated in the imaging processing.

The media size is the setting of the size of the medium included in the image to be generated. Examples of setting value of the media size include business card size, letter size, A4 size, and A3 size. The media conveying apparatus 100 can generate an image including a medium of the set media size by setting, for example, the timing at which the imaging device 117 finishes the imaging, and the position of the imaging element in the line sensor used for the imaging in the imaging processing. In addition, the media conveying apparatus 100 can generate an image including a medium of the set media size by executing, in the image processing, cropping of the image generated in the imaging processing.

The color is the setting of the color of an image to be generated. Examples of the setting value of the color include a binary value, gray scale, and a color. The media conveying apparatus 100 can change the color of the image to be generated by setting the color of the light emitted by the light source of the imaging device 117, the gradation range converted by the A/D converter, and the like in the imaging processing. Further, the media conveying apparatus 100 can change the color of the image to be generated by executing, in the image processing, grayscale conversion or binarization of the color image generated in the imaging processing.

The background color is the setting of the color of a portion of the image to be generated other than the medium, and white, black, and the like are set as the setting value of the background color. The media conveying apparatus 100 can change the background color in the image to be generated by switching the position of the backing (opposing position/non-opposing position) of the imaging device 117 in the imaging processing.

Figure 7:
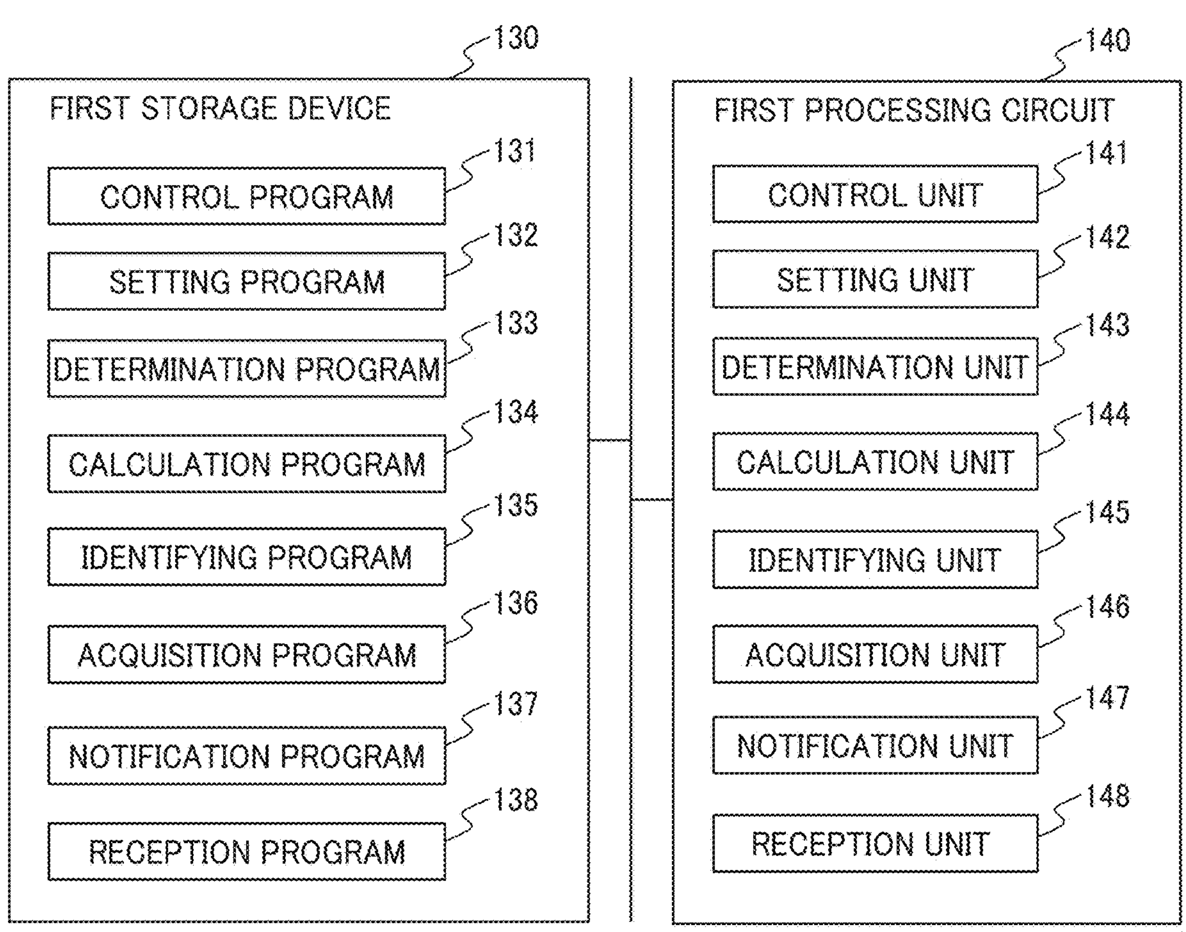
FIG. 7 is a diagram illustrating a schematic configuration of a first storage device and a first processing circuit according to an embodiment.

FIG. 7 is a diagram illustrating a schematic configuration of the first storage device 130 and the first processing circuit 140 according to the present embodiment.

As illustrated in FIG. 7, the first storage device 130 stores a control program 131, a setting program 132, a determination program 133, a calculation program 134, an identifying program 135, an acquisition program 136, a notification program 137, and a reception program 138. Each of these programs is a functional module implemented by software operating on a processor. The first processing circuit 140 reads the programs stored in the first storage device 130 and operates according to the programs read, thereby functioning as a control unit 141, a setting unit 142, a determination unit 143, a calculation unit 144, an identifying unit 145, an acquisition unit 146, a notification unit 147 and a reception unit 148.

Figure 8:
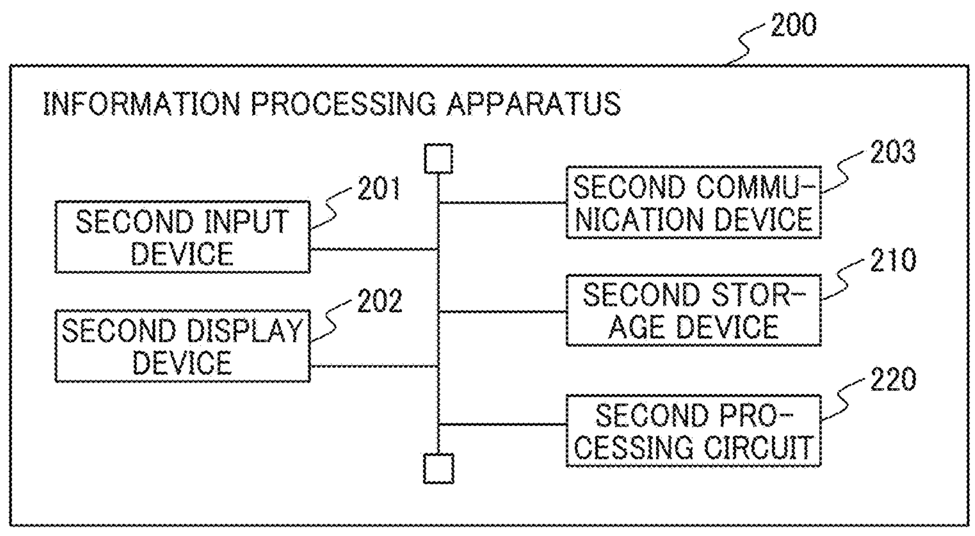
FIG. 8 is a block diagram illustrating a schematic configuration of an information processing apparatus according to an embodiment.

FIG. 8 is a schematic block diagram illustrating a configuration of the information processing apparatus 200 according to the present embodiment.

The information processing apparatus 200 includes a second input device 201, a second display device 202, a second communication device 203, a second storage device 210, and a second processing circuit 220.

The second input device 201 includes an input device such as a keyboard and a mouse, and an interface circuit that acquires signals from the input device, and the second input device 201 outputs a signal corresponding to the operation performed by the user to the second processing circuit 220.

The second display device 202 has a display including a liquid crystal, an organic EL, and the like, and an interface circuit that outputs image data to the display, and the second display device 202 displays various information on the display according to an instruction from the second processing circuit 220.

The second communication device 203 includes an antenna that transmits and receives wireless signals, and a wireless communication interface circuit that transmits and receives signals through a wireless communication line according to a predetermined communication protocol such as the wireless LAN protocol. The second communication device 203 communicates with the media conveying apparatus 100, and according to an instruction from the second processing circuit 220, is communicatively connected to the media conveying apparatus 100 to transmit and receive various images and information. The second communication device 203 may have a wired communication interface circuit compliant with a communication protocol such as the TCP/IP, and may be connected to the media conveying apparatus 100 via a network. Further, the second communication device 203 may have an interface circuit compatible with a serial bus such as the USB, and may be connected to the media conveying apparatus 100 via a wired cable such as the USB cable.

The second storage device 210 includes memories such as a RAM or ROM; a fixed disk device such as a hard disk; or a portable storage device such as a flexible disk or an optical disk. The second storage device 210 stores, for example, computer programs, databases, tables, used in various processes performed by the information processing apparatus 200. The computer program may be installed in the second storage device 210 from a computer-readable portable recording medium such as the CD-ROM or the DVD-ROM using a known setup program or the like. Further, the computer program may be distributed from a server or the like and installed in the second storage device 210.

The second processing circuit 220 operates according to a program stored in the second storage device 210 in advance. The second processing circuit 220 is, for example, a CPU. A DSP, LSI, ASIC, FPGA, and the like may be used as the second processing circuit 220.

The second processing circuit 220 is connected to the second input device 201, the second display device 202, the second communication device 203, the second storage device 210, and the like, and controls each of these units. The second processing circuit 220 performs data transmission/reception control with the media conveying apparatus 100 via the second communication device 203, input control of the second input device 201, display control of the second display device 202, and the like.

Figure 9:
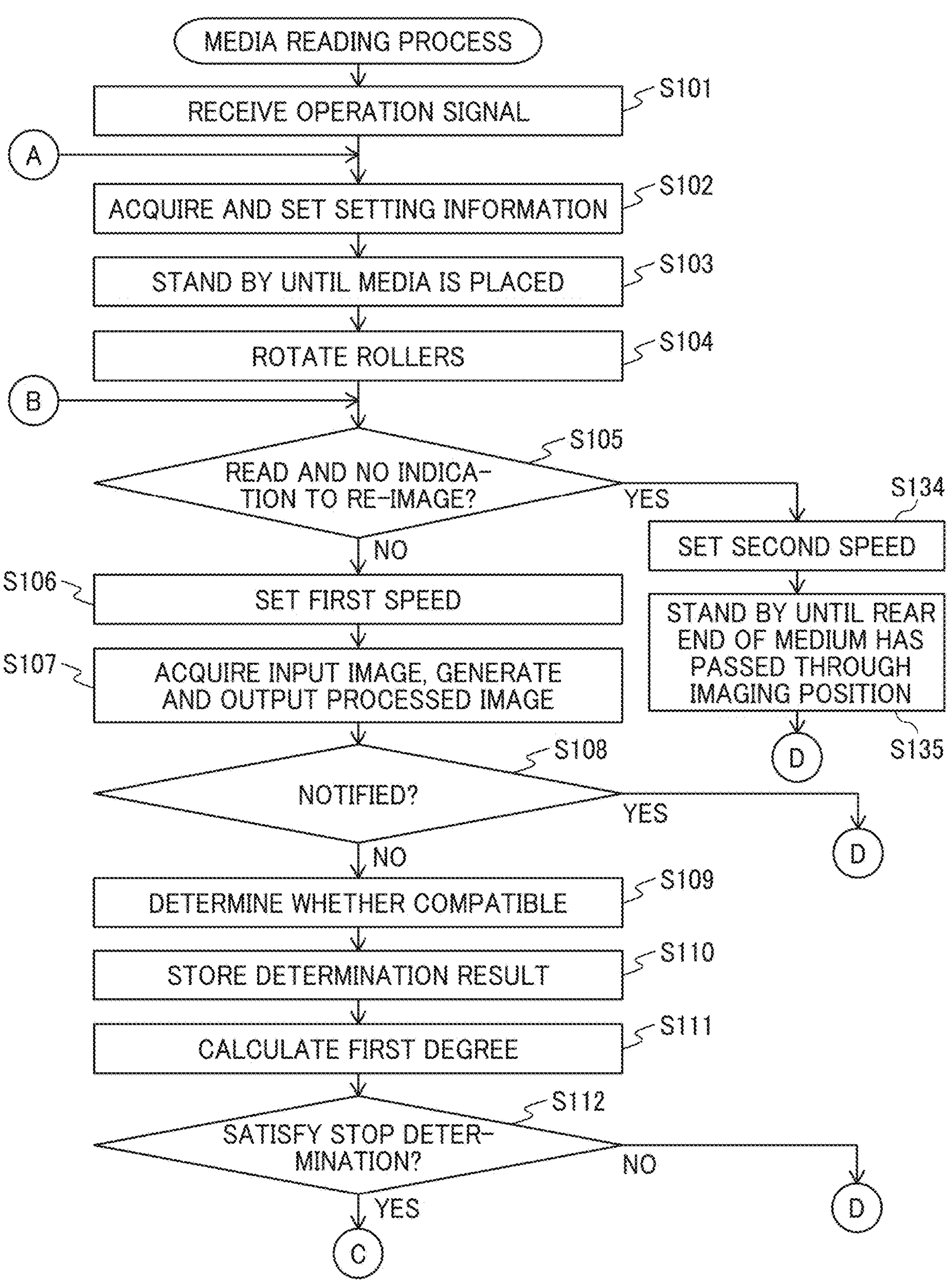
FIG. 9 is a flowchart illustrating an example of the operation of a media reading process.
Figure 10:
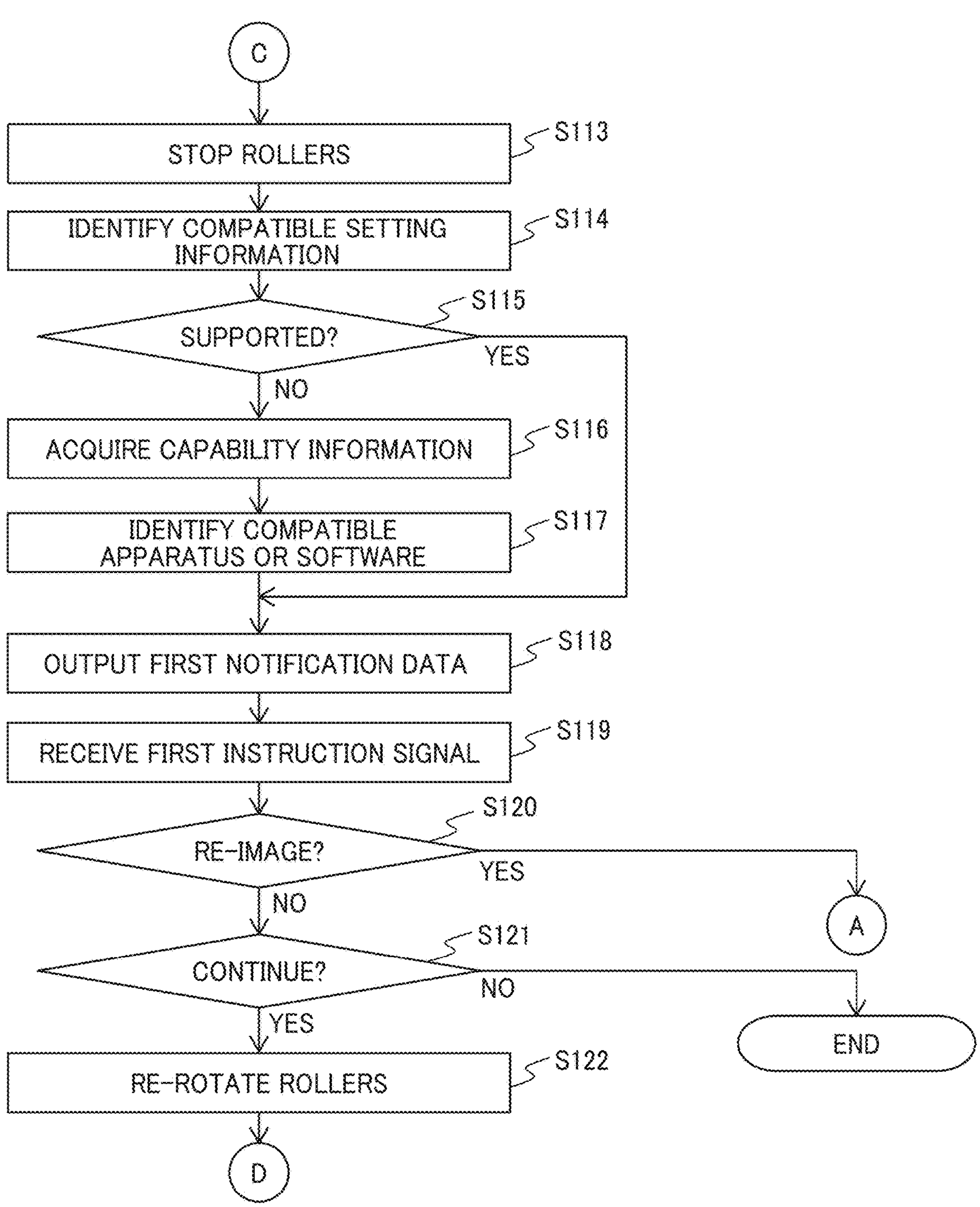
FIG. 10 is a flowchart illustrating an example of the operation of a media reading process.
Figure 11:
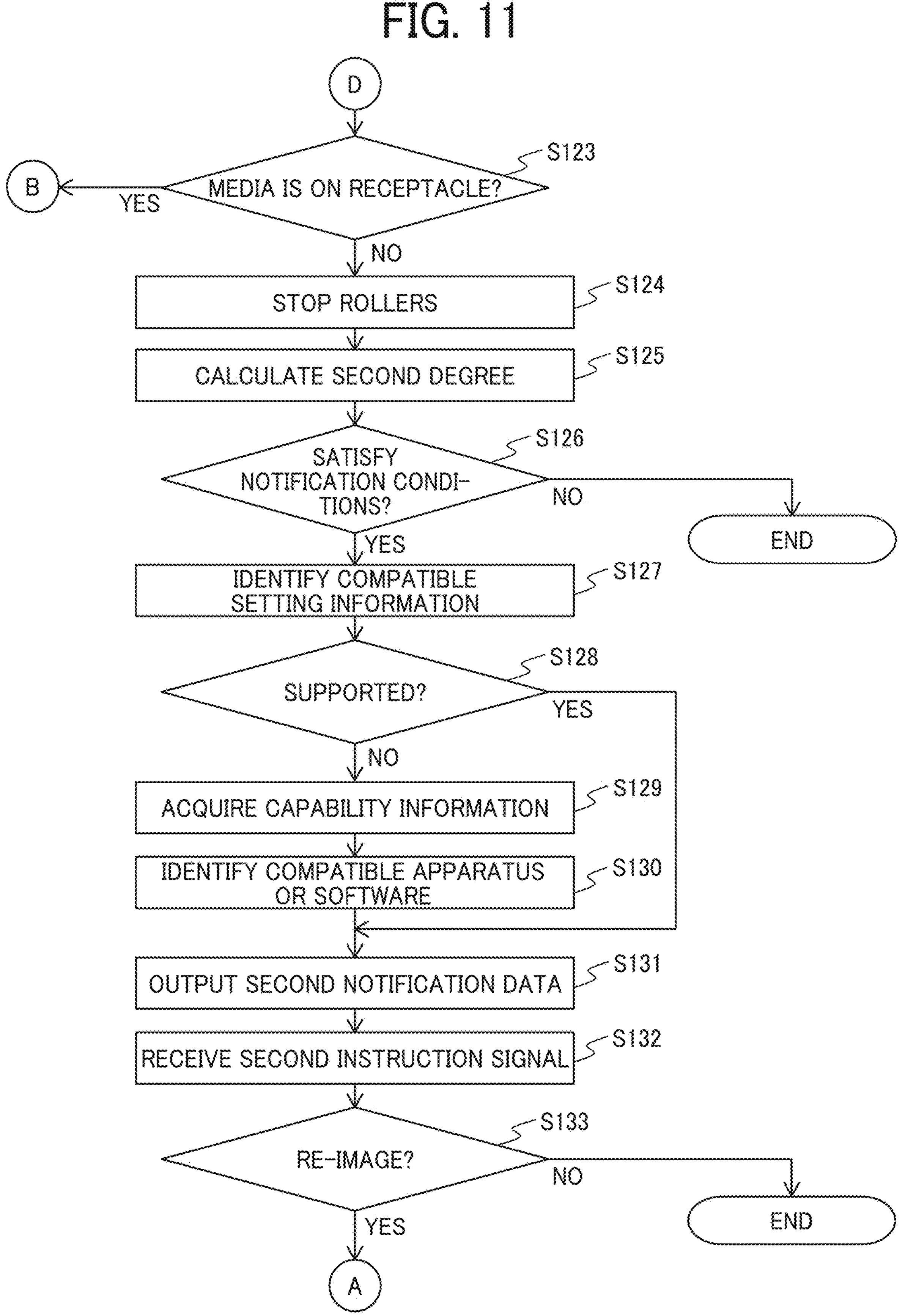
FIG. 11 is a flowchart illustrating an example of the operation of a media reading process.

FIGS. 9, 10, and 11 are flowcharts illustrating example operations in the media reading process according to the present embodiment.

A description is given below of example operations in the media reading process of the media conveying apparatus 100 according to the present embodiment, with reference to the flowchart of FIGS. 9, 10, and 11. The operation process described below is mainly executed by the first processing circuit 140 in cooperation with each component of the media conveying apparatus 100 according to a program pre-stored in the first storage device 130.

The control unit 141 stands by until a reading instruction to read media is input by the user using the first input device 105 or the information processing apparatus 200 and an operation signal indicating the reading the medium is received from the first input device 105 or the first communication device 122 (step S101). The operation signal includes setting information regarding imaging processing or image processing designated by the user using the first input device 105 or the information processing apparatus 200 along with a reading instruction.

Next, the setting unit 142 acquires the setting information included in the operation signal and sets the setting information in, for example, the imaging device 117 and motor 121 to generate an input image according to the settings specified by the setting information (step S102). The setting information may not be designated together with the reading instruction, and may be set in advance and stored in the first storage device 130 before the reading instruction is input. In that case, the setting unit 142 acquires the setting information by reading the setting information from the first storage device 130. Further, the control unit 141 sets (initializes) the media number of the medium to be conveyed to 1.

Next, the control unit 141 stands by until the media are placed on the receptacle 103 (step S103). The control unit 141 acquires a first media signal from the first media sensor 111 and determines whether media are placed on the receptacle 103 based on the acquired first media signal.

Next, the control unit 141 drives the motor 121 to rotate the feeding roller 112, the separation roller 113, the first conveyance roller 114, the second conveyance roller 115, the third conveyance roller 118, and/or the fourth conveyance roller 119 (step S104). Thus, the control unit 141 controls the above-mentioned elements to convey the media placed on the receptacle 103.

Next, the control unit 141 determines whether the medium to be conveyed has been imaged and whether the medium is a target of re-imaging (step S105). When re-imaging is instructed to the imaged medium by the user in the process to be described later, the imaged media is re-conveyed. In this case, only the medium for which the setting information is determined to be incompatible is the target of re-imaging. The control unit 141 determines whether the medium to be conveyed has been imaged based on whether the media number of the media being conveyed has already been stored in the result table. Furthermore, the control unit 141 determines whether the medium to be conveyed is a target of re-imaging based on whether the determination result stored in the result table in association with the media number of the media being conveyed indicates incompatibility. When the medium to be conveyed has been imaged and is not a target of re-imaging, the control unit 141 proceeds to step S134.

By contrast, when the medium to be conveyed has not been imaged or the medium to be conveyed is a target of re-imaging, the setting unit 142 sets the rotation speed of the motor 121 to the first speed (step S106). The first speed is a speed at which an input image is generated according to the setting information acquired in step S102, in particular, a speed at which a processed image having a resolution specified by the setting information can be generated.

Next, the control unit 141 acquires the input image from the imaging device 117, generates a processed image based on the acquired input image, and outputs the generated processed image by transmitting the generated processed image to the information processing apparatus 200 via the first communication device 122 (step S107).

For example, the control unit 141 determines whether the leading end of the medium has passed the position of the second media sensor 116 based on the second media signal received from the second media sensor 116. The control unit 141 acquires the second media signal periodically from the second media sensor 116 and determines that the leading end of the medium has passed the position of the second media sensor 116 when the signal value of the second media signal changes from a value indicating the absence of a medium to a value indicating the presence of a medium. The control unit 141 controls the imaging device 117 to start imaging when the leading end of the medium has passed the position of the second media sensor 116. The control unit 141 controls the imaging device 117 to generate the input image according to the setting information acquired in step S102.

Thereafter, the control unit 141 controls the imaging device 117 to end imaging when the medium has been conveyed by the amount of the media size indicated by the setting information acquired in step S102 plus the margin. The control unit 141 may control the imaging device 117 to end imaging when the rear end of the medium has passed through the imaging position of the imaging device 117. For example, the control unit 141 determines whether the rear end of the medium has passed the position of the second media sensor 116 based on the second media signal received from the second media sensor 116. The control unit 141 acquires the second media signal periodically from the second media sensor 116 and determines that the leading end of the medium has passed the position of the second media sensor 116 when the signal value of the second media signal changes from a value indicating the presence of a medium to a value indicating the absence of a medium. The control unit 141 determines that the rear end of the medium has passed the imaging position of the imaging device 117 when a first predetermined time has elapsed since the rear end of the medium passed the position of the second media sensor 116. The first predetermined time is set to the time taken for the medium to move from the second media sensor 116 to the imaging position.

The control unit 141 acquires the input image from the imaging device 117 every time the imaging device 117 generates a predetermined line of the input image, and synthesizes the input images when the imaging device 117 ends imaging. The control unit 141 may collectively acquire input images for all lines at a time when the imaging device 117 ends the imaging. The control unit 141 generates the processed image by performing the image processing on the input image according to the setting information acquired in step S102. When no image processing needs to be performed, the control unit 141 uses the input image itself as the processed image. The processed image is an example of an image based on the input image. When the conveyed medium is not yet imaged (imaged for the first time), the control unit 141 stores the media number of the conveyed medium, the acquired input image, and the generated processed image in the result table in association with each other. By contrast, when the conveyed medium has been imaged (the medium is a target of re-imaging), the control unit 141 replaces the input image and the processed image stored in the result table in association with the media number of the conveyed medium with an input image and a processed image newly acquired, respectively.

Furthermore, when the conveyed medium is not yet imaged (imaged for the first time), the control unit 141 transmits the processed image together with the media number thereof to the information processing apparatus 200. The second processing circuit 220 of the information processing apparatus 200 receives the processed image and the media number from the media conveying apparatus 100 via the second communication device 203, and stores the received processed image and the received media number in the second storage device 210 in association with each other. By contrast, when the conveyed medium has been imaged (a target of re-imaging), the control unit 141 transmits a newly generated processed image and a replacement request signal to the information processing apparatus 200 via the first communication device 122. The replacement request signal is a signal for requesting replacement of the processed image stored in the second storage device 210 with a newly generated processed image, and the replacement request signal includes a media number corresponding to the processed image to be replaced. When the second processing circuit 220 of the information processing apparatus 200 receives the replacement request signal from the media conveying apparatus 100 via the second communication device 203, the second processing circuit 220 replaces the processed image associated with the media number included in the replacement request signal with the newly received processed image.

Next, the control unit 141 determines whether the notification unit 147 has notified the user that the setting information is incompatible with the conveyed medium (step S108). When the determination unit 143 determines that the setting information is incompatible with the conveyed medium in the processing to be described later, the notification unit 147 notifies the user of the determination result. When the user has been notified that the setting information is incompatible with the conveyed media, the control unit 141 proceeds to step S123. In this case, the determination unit 143 does not thereafter determine whether the setting information is compatible with the conveyed medium. As a result, thereafter, the control unit 141 does not stop conveying subsequent media even when the setting information is incompatible with the conveyed medium, and the notification unit 147 does not notify the user that the setting information is incompatible with the conveyed medium. This saves the user from having to repeatedly stop the conveying of the media and receive similar notification after receiving the notification that the setting information is incompatible with the conveyed medium and determining to continue the conveying of the media according to the setting information. The media conveying apparatus 100 can improve convenience for the user without making the user feel troublesome, and can minimize an increase in processing time of the media reading processing.

Next, the determination unit 143 determines whether the setting information set by the user is compatible with the medium (the feature of the input image) imaged in the input image based on the input image (step S109).

For example, the determination unit 143 uses known optical character recognition (OCR) technology to detect characters from the input image. The determination unit 143 determines that the setting information is incompatible with the medium imaged in the input image when the ratio of the number of under-threshold-pixel characters to the number of all detected characters is equal to or greater than a threshold ratio. An under-threshold-pixel character is a character whose pixel count is less than a pixel number threshold.

The threshold pixel number and the threshold ratio for character number are set in advance.

The determination unit 143 may determine whether the setting information is compatible with the medium imaged in the input image based on the character size (point) of each detected character on the medium. In that case, the resolution for imaging a paracellular character size is preset in the first storage device 130 for each character size. For example, when the character size is less than 8 points, the resolution is set to 400 dpi or more. When the character size is 8 points or more and 10 points or less, the resolution is set to 300 dpi or more. When the character size is greater than 10 points, the resolution is set to 200 dpi or more. The determination unit 143 identifies the character size from the pixel number of each detected character and the resolution included in the setting information, and determines whether the resolution indicated in the setting information satisfies the resolution of the identified character size.

The determination unit 143 determines that the setting information is incompatible with the medium imaged in the input image when the ratio of the number of unsatisfied-resolution characters to the number of all detected characters is equal to or greater than the threshold ratio. An unsatisfied-resolution character is a character in which the resolution indicated in the setting information does not satisfy the resolution set for the character size. Further, the determination unit 143 determines whether the input image includes image data other than text or ruled lines. The determination unit 143 determines that the input image includes image data other than text or ruled lines when the variation degree of the gradation values of pixels in the input image is equal to or greater than a variation threshold. The gradation value is a brightness value, a color value, or the like. The variation degree herein is variance, standard deviation, or the like. By contrast, the determination unit 143 determines that the input image does not include image data other than text or ruled lines when the variation degree of the gradation value of pixels in the input image is less than the variation threshold.

The determination unit 143 may determine whether the input image includes image data other than text or ruled lines by a discriminator that has been pre-trained to output information indicating whether the image includes image data other than text or ruled lines when the image is input. The discriminator is pre-trained using a plurality of images including various types of media, for example, by deep learning, and is stored in the first storage device 130 in advance. The determination unit 143 inputs the input image to a discriminator, and determines whether the input image includes image data other than text or ruled lines based on information output from the discriminator.

The determination unit 143 determines that the setting information is incompatible with the medium imaged in the input image when the determination unit 143 determines that the input image includes image data other than text or ruled lines and the resolution indicated in the setting information is equal to or less than a predetermined first resolution threshold (for example, 200 dpi). By contrast, the determination unit 143 determines that the setting information is incompatible with the medium imaged in the input image when the determination unit 143 determines that the input image does not include image data other than text or ruled lines and the resolution indicated in the setting information is equal to or more than a predetermined second resolution threshold (for example, 600 dpi).

The determination unit 143 determines that the setting information is incompatible with the medium imaged in the input image when the determination unit 143 determines that the input image includes image data other than text or ruled lines, and the color indicated in the setting information is binary. By contrast, the determination unit 143 determines that the setting information is incompatible with the medium imaged in the input image when the determination unit 143 determines that the input image does not include image data other than text or ruled lines, and the color indicated in the setting information is a color.

Further, the determination unit 143 detects edge pixels from the input image using a known image processing technique, and detects the largest area among the areas surrounded by the edge pixels as the medium area. The determination unit 143 calculates the size of the medium imaged in the input image from the number of pixels included in the detected medium area and the resolution at which the input image is generated. The determination unit 143 determines that the setting information is incompatible with the medium imaged in the input image when the calculated size and the media size indicated in the setting information do not match. The determination unit 143 determines that not the entire medium is included in the input image generated according to the setting information and the setting information is incompatible with the medium imaged in the input image when the detected medium area in the input image overlaps with the bottom end of the input image.

Further, the determination unit 143 extracts pixels having gradation values within a range that is considered to be show-through in the input image in which one side of the medium is imaged as candidate pixels. The determination unit 143 extracts pixels whose brightness values are equal to or less than a predetermined brightness threshold (pixels that are close to black) in the input image in which the other side of the medium is imaged as low-brightness pixels. The determination unit 143 determines that the show-through of the medium has occurred when the ratio of the number of low-brightness pixels extracted at the position corresponding to the candidate pixels to the number of extracted candidate pixels is equal to or greater than a predetermined low-brightness pixel ratio threshold. The determination unit 143 determines that the setting information is incompatible with the medium imaged in the input image when the determination unit 143 determines that the show-through of the medium has occurred and the background color indicated in the setting information is white.

Next, the determination unit 143 stores a determination result indicating whether the setting information is compatible with the medium imaged in the input image in the result table (step S110). The determination unit 143 stores the determination result in the result table in association with the media number of the conveyed medium.

Next, the calculation unit 144 refers to the result table and calculates a first degree that is the degree of the number of media for which the setting information is determined to be incompatible (may be referred to as "incompatible media" in the following description) among the plurality of conveyed media (step S111). Specifically, the calculation unit 144 calculates, as the first degree, a ratio of incompatible media in a predetermined number of media out of the plurality of conveyed media, or the number of incompatible media in the predetermined number of media out of the plurality of conveyed media. The predetermined number of media among the plurality of conveyed media is, for example, a predetermined number of media conveyed most recently. The predetermined number is preset to a desired value equal to or greater than 2. The number of incompatible media may be a consecutive number of incompatible media.

Next, the control unit 141 determines whether the first degree calculated by calculation unit 144 satisfies a stop condition (step S112). The stop condition is preset to, for example, a condition that the ratio calculated by the calculation unit 144 is larger than the first ratio threshold, or the number of media calculated by the calculation unit 144 is larger than the first media number threshold. The stop condition may be set to satisfy one or both of the calculated ratio being larger than the first ratio threshold and the calculated number of media being larger than the first media number threshold. The first ratio threshold and/or the first media number threshold is an example of a threshold, and is preset to a desired value. The first ratio threshold and/or the first media number threshold may be specified by the user using the first input device 105 or the information processing apparatus 200.

When the first degree does not satisfy the stop condition, the control unit 141 proceeds to step S123 without executing particular processing. That is, when the calculated first degree (ratio or number of media) is equal to or less than the threshold (first ratio threshold or first media number threshold), the control unit 141 does not stop the conveying of the media, and the notification unit 147 does not notify the user of the information on the determination result.

As described above, the media conveying apparatus 100 does not immediately determine that the setting information set by the user is inappropriate when the setting information is incompatible with one medium, but determines whether the setting information is appropriate based on whether the setting information is compatible with two or more media.

Thus, the media conveying apparatus 100 can reduce erroneous determination on whether the setting information is appropriate. Therefore, the media conveying apparatus 100 can reduce erroneous stop of the conveying of the media or erroneous notification to the user, and can minimize an increase in the processing time of the media reading process.

By contrast, when the first degree satisfies the stop condition, the control unit 141 stops the motor 121. As a result, the control unit 141 stops the feeding roller 112, the separation roller 113, the first conveyance roller 114, the second conveyance roller 115, the third conveyance roller 118, and/or the fourth conveyance roller 119, and suspends conveying subsequent media (step S113).

Next, the identifying unit 145 identifies the setting information compatible with the medium for which the setting information is determined to be incompatible (step S114). The identifying unit 145 identifies the setting information compatible with the medium for which the setting information is determined to be incompatible by the determination unit 143 among the media of the determination target by the determination unit 143, that is, the predetermined number of media of which the first degree is to be calculated. The identifying unit 145 identifies setting information that is compatible with each corresponding medium based on the determination result determined by the determination unit 143 for each item determined to be incompatible by the determination unit 143.

For example, when the determination unit 143 determines that the item "resolution" is incompatible, the identifying unit 145 identifies the setting information that is compatible with each corresponding medium for the item "resolution."

When the determination unit 143 determines that the input image includes image data other than text or ruled lines, the identifying unit 145 identifies a resolution that is larger than the first resolution threshold (for example, 200 dpi) as the setting information that is compatible with the medium. In that case, the identifying unit 145 may identify the maximum resolution supported by the media conveying apparatus 100 as the setting information that is compatible with the medium. By contrast, when the determination unit 143 determines that the input image does not include image data other than text or ruled lines, the identifying unit 145 identifies a resolution that is less than the second resolution threshold (for example, 600 dpi) as the setting information that is compatible with the medium. In that case, the identifying unit 145 may identify the minimum resolution supported by the media conveying apparatus 100 as the setting information that is compatible with the medium. When the determination unit 143 determines that the item "resolution" is incompatible with a plurality of media, the identifying unit 145 identifies the maximum resolution among the identified resolutions as the setting information that is compatible with the media for which the setting information is determined to be incompatible, so that the item "resolution" is compatible with all the media.

Further, in a case where the determination unit 143 determines that the item "color" is incompatible, the identifying unit 145 identifies the setting information that is compatible with the corresponding medium for the item "color."

In a case where the determination unit 143 determines that the input image includes image data other than text or ruled lines, the identifying unit 145 identifies color or grayscale as the setting information that is compatible with the media. By contrast, in a case where the determination unit 143 determines that the input image does not include image data other than text or ruled lines, the identifying unit 145 identifies grayscale or binary as the setting information that is compatible with the media. In a case where the determination unit 143 determines that the item "color" is incompatible with a plurality of media, the identifying unit 145 identifies the color that requires the highest capability among the identified colors as the setting information that is compatible with the medium for which the setting information is determined to be incompatible, so that the item "color" is compatible with all the media. The required capability increases in the order of color, grayscale, and binary.

In a case where the determination unit 143 determines that the item "media size" is incompatible, the identifying unit 145 identifies setting information that is compatible with the corresponding medium for the item "media size."

The identifying unit 145 identifies the size of the media calculated in step S109 as the setting information that is compatible with the media. In a case where the determination unit 143 determines that the item "media size" is incompatible with a plurality of media, the identifying unit 145 identifies the largest media size among the identified media sizes as the setting information that is compatible with the medium for which the setting information is determined to be incompatible, so that the item "media size" is compatible with all the media.

Further, in a case where the determination unit 143 determines that the item "background color" is incompatible, the identifying unit 145 identifies the setting information that is compatible with the corresponding medium for the item "background color."

In a case where the determination unit 143 determines that the show-through has occurred on any of the media, the identifying unit 145 identifies black as the setting information that is compatible with the media.

Next, the identifying unit 145 determines whether the setting information identified as the setting information that is compatible with the medium is supported by the media conveying apparatus 100 (step S115). When the identified setting information is supported by the media conveying apparatus 100, the identifying unit 145 moves the process to step S118 without executing particular processing.

By contrast, when the identified setting information is not supported by the media conveying apparatus 100, the acquisition unit 146 acquires capability information indicating the capability of other media conveying apparatuses or other software regarding imaging processing or image processing (step S116). Other media conveying apparatuses are media conveying apparatuses other than the media conveying apparatus 100 included in the image processing system 1, and other software is software other than the software installed on the media conveying apparatus 100 included in the image processing system 1. The software is driver software or the like that causes the media conveying apparatus 100 to execute each process. The capability information indicates, for each item specified in the setting information, the functions that the media conveying apparatus or software can perform (the content of the operation in imaging the media or the content of the image processing to be executed on the obtained image). The capability information of each media conveying apparatus or each software included in the image processing system 1 is stored in advance in the second storage device 210 of the information processing apparatus 200 or a storage device of an external server device. The acquisition unit 146 acquires the capability information of each media conveying apparatus or each software by receiving the capability information from the information processing apparatus 200 or the external server device via the first communication device 122.

Next, the identifying unit 145 identifies a media conveying apparatus or software that has the capability of being compatible with the medium for which the setting information is determined to be incompatible, from among other media conveying apparatuses or other software (step S117). The identifying unit 145 identifies the media conveying apparatus or software that has the capability information that can correspond to the setting information identified in step S108 as the media conveying apparatus or software that has the capability of being compatible with the medium for which the setting information is determined to be incompatible.

Next, the notification unit 147 generates the first notification data for notifying the user that the setting information is incompatible with the conveyed media. The notification unit 147 outputs, to the user, the generated first notification data by displaying the generated first notification data on the first display device 106 or transmitting the generated first notification data to the information processing apparatus 200 via the first communication device 122 (step S118). The information processing apparatus 200 causes the second display device 202 to display the received first notification data when the information processing apparatus 200 receives the first notification data from the media conveying apparatus 100 via the second communication device 203. The first notification data is an example of information on the determination result by the determination unit 143.

Figure 12:
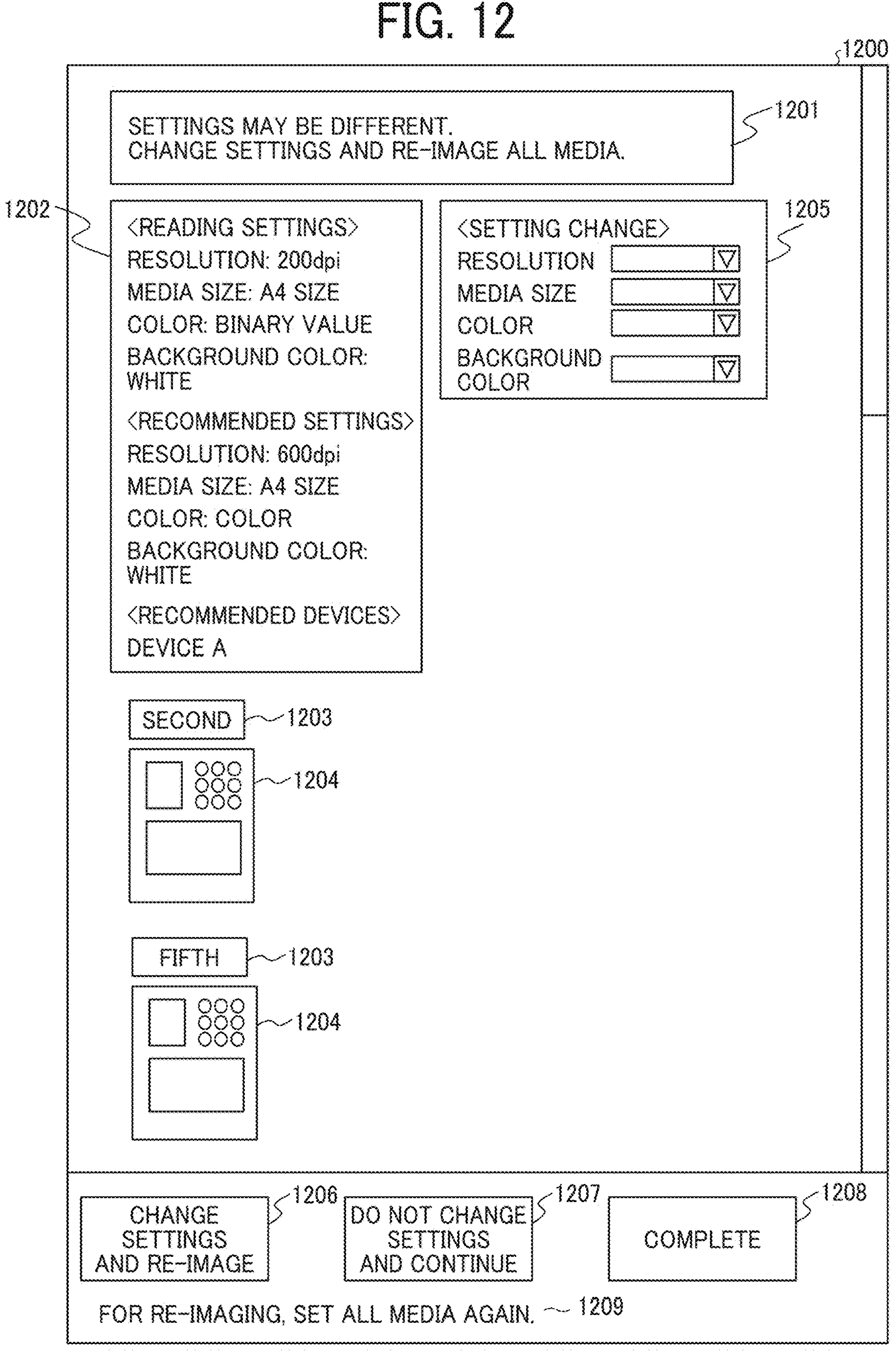
FIG. 12 is a schematic diagram illustrating an example of first notification data.

FIG. 12 is a schematic diagram illustrating an example of a first notification data 1200.

As illustrated in FIG. 12, the first notification data 1200 includes summary information 1201, detailed information 1202, a media number 1203, an image 1204, a setting change object 1205, a re-imaging button 1206, a continuation button 1207, an end button 1208, and accompanying information 1209. The summary information 1201 indicates a determination result by the determination unit 143, that is, the setting information set by the user is incompatible with at least some of the media, and indicates a proposal to change the setting information and re-image all the media.

In this manner, the notification unit 147 outputs a proposal to change the setting information and re-image all the media as the information on the determination result. When the first degree satisfies the stop condition, media of different types are not mixed in a bundle of media collectively set on the receptacle 103, and there is a high possibility that the setting information itself set by the user is erroneous. In this case, the media conveying apparatus 100 recommends the user to re-image all the media with changed setting information, thereby increasing the probability of generating appropriate processed images.

The detailed information 1202 indicates the setting information set by the user, the recommended setting that is compatible with the medium for which the setting information is determined to be incompatible, and the recommended apparatus or software that supports the recommended setting that is compatible with the media. The recommended setting is specific information identified by the identifying unit 145 as the setting information that is compatible with the medium for which the setting information is determined to be incompatible. The recommended device or recommended software is a media conveying apparatus or software identified by the identifying unit 145 as a media conveying apparatus or software that has the capability of being compatible with the medium for which the setting information is determined to be incompatible.

In this manner, the notification unit 147 notifies the user of the specific information identified by the identifying unit 145 as the setting information that is compatible with the medium for which the setting information is determined to be incompatible. This allows the user to recognize the appropriate settings for each medium, and to re-convey and re-image each medium in accordance with the settings. Therefore, the media conveying apparatus 100 can improve convenience for the user.

The notification unit 147 outputs information on a media conveying apparatus or software that has the capability of being compatible with the medium for which the setting information is determined to be incompatible, from among other media conveying apparatuses or other software. As a result, the user can recognize a media conveying apparatus or software that can generate an image suitable for each medium, and can obtain a desired image using the media conveying apparatus or software. Therefore, the media conveying apparatus 100 can improve convenience for the user.

The media number 1203 and the image 1204 are displayed in association with each other for each medium for which the setting information is determined to be incompatible. The media number 1203 is a media number of a medium for which the setting information is determined to be incompatible among the determination target media, and the image 1204 is an input image in which the medium is imaged or a processed image based on the input image. By viewing the media number 1203 and the image 1204, the user can confirm the image of each medium imaged or processed according to the setting information, and can confirm the validity of the setting information. The setting change object 1205 is an object for receiving changes in the setting information by the user, and includes a box for inputting the setting values specified by the user for each item included in the setting information.

The re-imaging button 1206 is a button for changing the setting information and executing re-imaging of the media. By pressing the re-imaging button 1206, the user can cause the re-imaging to be executed of each medium for which the setting information is determined to be incompatible according to the setting information specified by the setting change object 1205. The continuation button 1207 is a button for restarting the conveying and imaging of the medium without changing the setting information. By pressing the continuation button 1207, the user can restart the conveying and imaging of the remaining media according to the currently set setting information. The end button 1208 is a button for ending the media reading processing. The user can stop the conveying and imaging of the remaining media according to the currently set setting information by pressing the end button 1208. The accompanying information 1209 indicates that all the media need to be placed again when re-imaging is performed.

Next, the reception unit 148 stands by until an instruction to re-convey and re-image the medium, an instruction to continue the conveying and imaging of the medium, or an instruction to end the conveying and imaging of the medium is input by the user using the first input device 105 or the information processing apparatus 200 and the first instruction signal is received from the first input device 105 or the first communication device 122 (step S119). In a case where the re-imaging button 1206 is pressed by the user, the reception unit 148 receives a first instruction signal from the first input device 105 or the first communication device 122 that instructs to re-convey and re-image the media. The first instruction signal that instructs to re-convey and re-image the medium includes the setting information input to the setting change object 1205. In a case where the continuation button 1207 is pressed by the user, the reception unit 148 receives the first instruction signal from the first input device 105 or the first communication device 122 that instructs to continue (restart) conveying and imaging of the media. In a case where the end button 1208 is pressed by the user, the reception unit 148 receives the first instruction signal from the first input device 105 or the first communication device 122 that instructs to end the conveying and imaging of the media.

In a case where the reception unit 148 receives the first instruction signal, the reception unit 148 determines whether the first instruction signal instructs to re-convey and re-image the medium (step S120). In a case where the first instruction signal instructs to re-convey and re-image, the control unit 141 returns the process to step S102 and executes the subsequent processes from step S102. In this case, the user places again all the media conveyed so far and all the media that have not yet been conveyed so far on the receptacle 103. In step S102, the setting unit 142 acquires the setting information included in the first instruction signal and sets the setting information to the imaging device 117, the motor 121, and the like so that the input image is generated according to each setting indicated in the acquired setting information. Further, the control unit 141 sets (initializes) the media number of the medium to be conveyed to 1. In step S106, the setting unit 142 sets the rotation speed of the motor 121 to the first speed according to the setting information acquired in step S102.

In step S107, the control unit 141 controls the imaging device 117 so that the input image is generated according to the setting information acquired in step S102, and executes image processing on the input image according to the setting information acquired in step S102 to generate the processed image. The control unit 141 replaces the input image and the processed image stored, in association with the media number of the conveyed medium, in the result table with another input image and another processed image newly acquired. Furthermore, the control unit 141 transmits the newly generated processed image and the replacement request signal to the information processing apparatus 200 via the first communication device 122, and causes the information processing apparatus 200 to replace the processed image. Thus, when the control unit 141 re-images a medium for which the setting information is determined to be incompatible to reobtain the input image, the control unit 141 replaces a processed image with the reobtained processed image in the first storage device 130 and/or the second storage device 210 in which the processed image including that medium is stored. This eliminates the need for the user to find a processed image generated according to incorrect setting information and replace the processed image with a re-imaged processed image, and the media conveying apparatus 100 can improve convenience for the user.

By contrast, in step S120, when the re-conveying and the re-imaging of the medium are not instructed, the reception unit 148 determines whether the first instruction signal instructs the continuation of the conveying and imaging of the media or whether the first instruction signal instructs the end of the conveying and imaging of the media (step S121). When the instruction is given to end the conveying and imaging of the media, the control unit 141 ends the media reading process without conveying the remaining media.

By contrast, when the instruction is given to continue the conveying and imaging of the media, the control unit 141 re-starts the motor 121 and re-rotates the feeding roller 112, the separation roller 113, the first conveyance roller 114, the second conveyance roller 115, the third conveyance roller 118, and/or the fourth conveyance roller 119. Thereby, the control unit 141 controls the remaining media placed on the receptacle 103 to be conveyed (step S122).

Next, the control unit 141 determines whether the media remains on the receptacle 103 based on the first media signal received from the first media sensor 111 (step S123). When the media remains on the receptacle 103, the control unit 141 increments (+1) the media number of the medium to be conveyed, and sets the media number of the next media to be conveyed. Then, the control unit 141 returns the process to step S105 and repeats the processes of steps S105 to S123.

By contrast, when no media remains on the receptacle 103, the control unit 141 stops the motor 121 to stop the feeding roller 112, the separation roller 113, the first conveyance roller 114, the second conveyance roller 115, the third conveyance roller 118, and the fourth conveyance roller 119 (step S124). Thereby, the control unit 141 stops the conveying of the media.

Next, the calculation unit 144 refers to the result table and calculates a second degree that is a degree of the number of media for which the setting information is determined to be incompatible among the plurality of conveyed media (step S125). The calculation unit 144 calculates, as the second degree, a ratio of the media for which the setting information is determined to be incompatible or the number of media for which the setting information is determined to be incompatible among all the conveyed media. The number of incompatible media may be a consecutive number of incompatible media.

Next, the control unit 141 determines whether the second degree calculated by calculation unit 144 satisfies the notification condition (step S126). The notification condition is a less strict condition than the stop condition. The notification condition is preset to, for example, a condition that the ratio calculated by the calculation unit 144 is larger than the second ratio threshold, or the number of media calculated by the calculation unit 144 is larger than the second media number threshold. The notification condition may be set to satisfy, for example, one or both of the calculated ratio being larger than the second ratio threshold and the calculated number of media being larger than the second media number threshold. The second ratio threshold and the second media number threshold are preset to values smaller than the first ratio threshold and the first media number threshold, respectively. The second ratio threshold and the second media number threshold are each set to 0, for example. In this case, in a case where there is only one medium that is incompatible with the setting information, the user is notified. The second ratio threshold and/or the second media number threshold may be specified by the user using the first input device 105 or the information processing apparatus 200. In a case where the second degree does not satisfy the notification condition, the control unit 141 does not notify the user and ends the media reading process.

By contrast, in a case where the second degree satisfies the notification condition, the identifying unit 145 identifies the setting information compatible with the medium for which the setting information is determined to be incompatible (step S127) in the same manner as the process of step S114. The identifying unit 145 identifies the setting information compatible with all the medium for which the determination unit 143 determines that the setting information is incompatible.

Next, the identifying unit 145 determines whether the setting information identified as the setting information that is compatible with the medium is supported by the media conveying apparatus 100 in the same manner as the process of step S115 (step S128). When the identified setting information is supported by the media conveying apparatus 100, the identifying unit 145 proceeds to step S131 without executing particular processing.

By contrast, when the identified setting information is not supported by the media conveying apparatus 100, the acquisition unit 146 acquires the capability information of other media conveying apparatuses or other software in the same manner as the process of step S116 (step S129).

Next, the identifying unit 145 identifies a media conveying apparatus or software that has the capability of being compatible with the medium for which the setting information is determined to be incompatible among other media conveying apparatuses or other software in the same manner as the process of step S117 (step S130).

Figure 13:
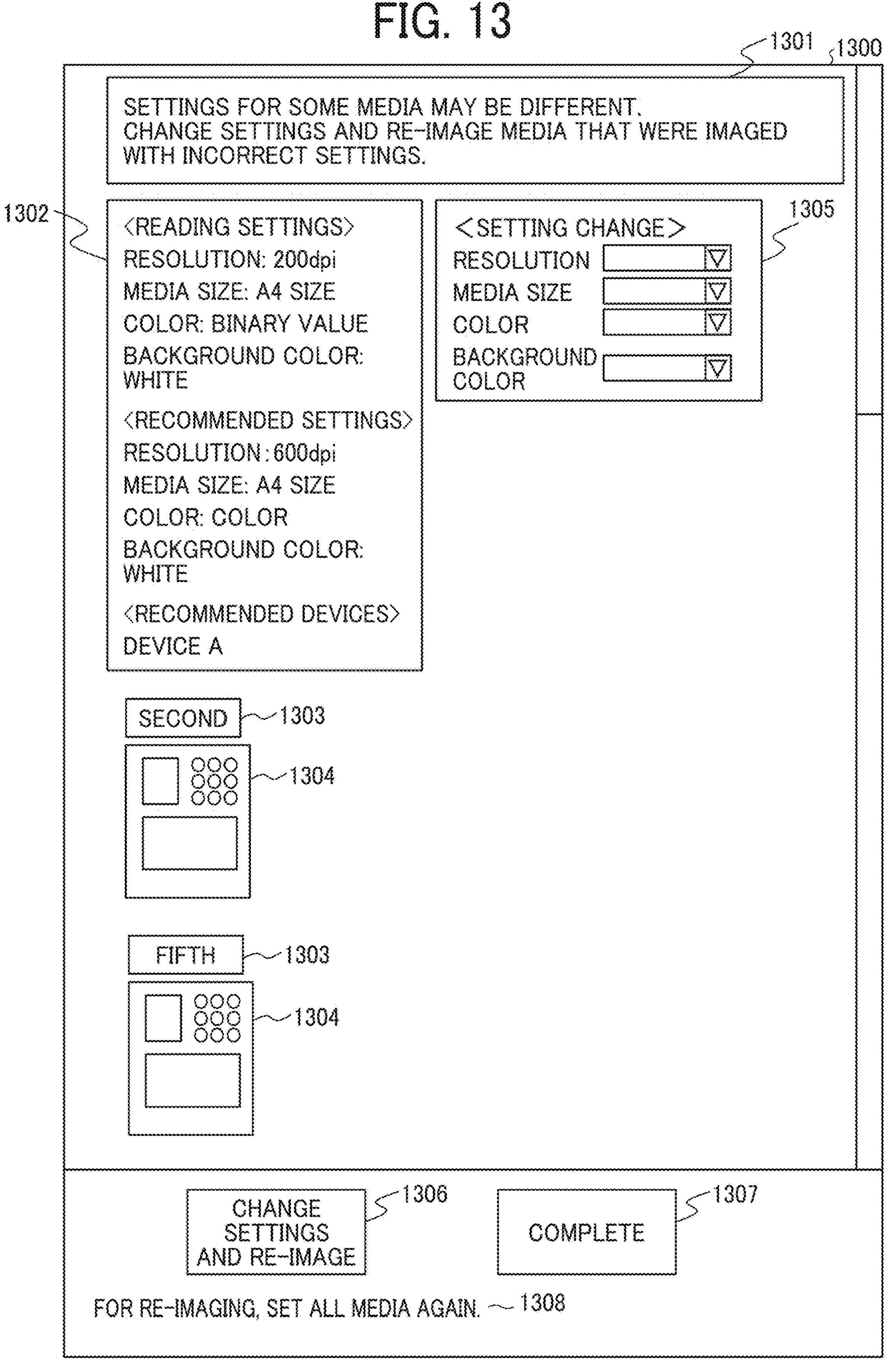
FIG. 13 is a schematic diagram illustrating an example of second notification data.

Next, the notification unit 147 generates the second notification data for notifying the user that the setting information is incompatible with the conveyed media. The notification unit 147 outputs, to the user, the generated second notification data by displaying the generated second notification data on the first display device 106 or transmitting the generated second notification data to the information processing apparatus 200 via the first communication device 122 (step S131). The information processing apparatus 200 causes the second display device 202 to display the received first notification data in a case where the information processing apparatus 200 receives the second notification data from the media conveying apparatus 100 via the second communication device 203. The second notification data is an example of information on the determination result by the determination unit 143. FIG. 13 is a schematic diagram illustrating an example of second notification data 1300.

As illustrated in FIG. 13, the second notification data 1300 includes summary information 1301, detailed information 1302, a media number 1303, an image 1304, a setting change object 1305, a re-imaging button 1306, an end button 1307, and accompanying information 1308. The summary information 1301 indicates a determination result by the determination unit 143, that is, that the setting information set by the user is incompatible with some of the media, and indicates a proposal to change the setting information and re-image the medium for which the setting information is determined to be incompatible.

As described above, when the first degree calculated by the calculation unit 144 does not satisfy the stop condition and the second degree satisfies the notification condition, the notification unit 147 outputs a proposal to change the setting information and re-image the medium for which the setting information is determined to be incompatible after all the media are conveyed. In a case where the first degree does not satisfy the stop condition and the second degree satisfies the notification condition, there is a high possibility that media of different types are mixed in the bundle of media collectively set on the receptacle 103, and there is a possibility that re-imaging is unnecessary depending on the situation. The media conveying apparatus 100 conveys all the media without interrupting and allows the user to select the process after all the media are conveyed, thereby executing an appropriate measure according to the situation.

The detailed information 1302, the media number 1303, the image 1304, the setting change object 1305, the re-imaging button 1306, the end button 1307, and the accompanying information 1308 are information, objects, or buttons similar to the detailed information 1202, the media number 1203, the image 1204, the setting change object 1205, the re-imaging button 1206, the end button 1208, and the accompanying information 1209 of the first notification data 1200, respectively. Here, the detailed information 1202 indicates a recommended setting compatible with all medium for which the setting information is determined to be incompatible, a recommended device or recommended software that supports a recommended setting compatible with all medium for which the setting information is determined to be incompatible, or the like. The media number 1303 is the media number of all the medium for which the setting information is determined to be incompatible.

Next, the reception unit 148 stands by until an instruction to re-convey and re-image the media, or an instruction to end the conveying and imaging of the media is input by the user using the first input device 105 or the information processing apparatus 200 and the second instruction signal is received from the first input device 105 or the first communication device 122 (step S132). In a case where the re-imaging button 1306 is pressed by the user, the reception unit 148 receives a second instruction signal from the first input device 105 or the first communication device 122 that instructs to re-convey and re-image the media. The second instruction signal that instructs to re-convey and re-image the media includes the setting information input to the setting change object 1305. In a case where the end button 1307 is pressed by the user, the reception unit 148 receives the second instruction signal from the first input device 105 or the first communication device 122 that instructs to end the conveying and imaging of the media.

In a case where the reception unit 148 receives the second instruction signal, the reception unit 148 determines whether the second instruction signal instructs to re-convey and re-image the media or instructs to end the conveying and imaging of the media (step S133). In a case where the second instruction signal instructs to end the conveying and imaging of the media, the control unit 141 ends the media reading process.

By contrast, in a case where the second instruction signal instructs to re-convey and re-image, the control unit 141 returns the process to step S102 and executes the subsequent processes from step S102. In this case, the user re-places all the conveyed medium on the receptacle 103. The user does not need to find the medium imaged according to the erroneous setting information and re-place the same on the receptacle 103, and the media conveying apparatus 100 can improve convenience for the user. In step S102, the setting unit 142 acquires the setting information included in the second instruction signal and sets the setting information to the imaging device 117, the motor 121, and the like so that the input image is generated according to each setting indicated in the acquired setting information. Further, the control unit 141 sets (initializes) the media number of the medium to be conveyed to 1. In step S106, the setting unit 142 sets the rotation speed of the motor 121 to the first speed according to the setting information acquired in step S102.

In step S107, the control unit 141 controls the imaging device 117 so that the input image is generated according to the setting information acquired in step S102, and executes image processing on the input image according to the setting information acquired in step S102 to generate the processed image. The control unit 141 replaces the input image and the processed image stored, in association with the media number of the conveyed medium, in the result table with another input image and another processed image newly acquired. Furthermore, the control unit 141 transmits the newly generated processed image and the replacement request signal to the information processing apparatus 200 via the first communication device 122, and causes the information processing apparatus 200 to replace the processed image. Thus, when the control unit 141 re-images a medium for which the setting information is determined to be incompatible to reobtain the input image, the control unit 141 replaces a processed image with the reobtained processed image in the first storage device 130 and/or the second storage device 210 in which the processed image including that medium is stored. This eliminates the need for the user to find a processed image generated according to incorrect setting information and replace the processed image with a re-imaged processed image, and the media conveying apparatus 100 can improve convenience for the user.

Furthermore, in a case where re-conveying and re-imaging are instructed in step S120 or S133 and it is determined in step S105 that the medium to be conveyed has been imaged and is not a target of re-imaging, the setting unit 142 sets the rotation speed of the motor 121 to the second speed (step S134). The second speed is a speed equal to or higher than the first speed, and is, for example, a maximum speed at which the media conveying apparatus 100 can convey the media.

Next, the control unit 141 stands by until the rear end of the medium passes the imaging position (step S135) without causing the imaging device 117 to image the medium, and proceeds to step S123.

As described above, in a case where all the media conveyed by the conveyor are re-conveyed, the imaging device 117 re-images only the medium for which the setting information is determined to be incompatible. Since the imaging device 117 does not image the medium, the media conveying apparatus 100 can convey the medium at a high speed without considering the imaging timing of the imaging device 117. Therefore, the media conveying apparatus 100 can reduce the processing time required for re-imaging. This is the end of the description of the media reading process.

Note that the process of step S108 is executed after the process of steps S109 and S110, and even when the user has been notified that the setting information is incompatible with the conveyed media, the determination unit 143 may determine whether the setting information is compatible with the medium imaged in the input image. In addition, the process of step S108, the process of step S114, the process of steps S115 to S117, the process of step S119, the process of step S120, the process of steps S125 to S126, the process of step S127, the process of steps S128 to S130, the process of steps S131 to S132, the process of step S133, and/or the process of steps S134 to S135 may be omitted.

As described above in detail, in a case where the ratio or the number of media for which the setting information is incompatible in the predetermined number of media is larger than the threshold, the media conveying apparatus 100 stops conveying subsequent media and notifies the user of the stop. This enables the media conveying apparatus 100 to improve convenience for the user.

In particular, in a case where the media conveying apparatus is used in business, a large number of media is often conveyed and imaged at a time. If erroneous setting is used in such a case, it is not known that an inappropriate image is generated until the confirmation phase after the conveying and imaging all the media are completed. Then, all the media need to be re-conveyed and re-imaged. Furthermore, if different types of media are mixed in a large number of media, the user needs to remove the different types of media from the bundle of media having been conveyed and imaged. Then, the user causes the apparatus to re-convey and re-image the different types of media. In a case where the setting information is incompatible with the conveyed media, the media conveying apparatus 100 suspends conveying subsequent media. Therefore, the user can cause the media conveying apparatus 100 to re-convey and re-image the media before conveying and imaging all the media are completed, and the media conveying apparatus 100 can minimize an increase in the processing time of the media reading processing. Furthermore, since the user can extract a medium incompatible with the setting from some already conveyed media instead of from all the media to be conveyed at a time, the user can easily extract a medium incompatible with the setting, and the media conveying apparatus 100 can improve the convenience for the user.

The media conveying apparatus 100 does not immediately determine that the setting information is inappropriate in a case where the setting information is incompatible with one medium, but determines whether the setting information is appropriate based on whether the setting information is compatible with two or more media. Thus, the media conveying apparatus 100 can reduce erroneous determination on whether the setting information is appropriate. Therefore, the media conveying apparatus 100 can reduce erroneous stop of the conveying of the media or erroneous notification to the user, and can minimize an increase in the processing time of the media reading process.

Further, even if the user has low knowledge or skill of image reading processing, the user can appropriately select setting information, another media conveying apparatus, or another software that can generate a desired image. This allows the media conveying apparatus 100 to prevent the occurrence of rework in the image reading process due to the use of inappropriate settings, media conveying apparatus 100, or software, thereby minimizing the decrease in the work efficiency or the work quality of the user.

Figure 14:
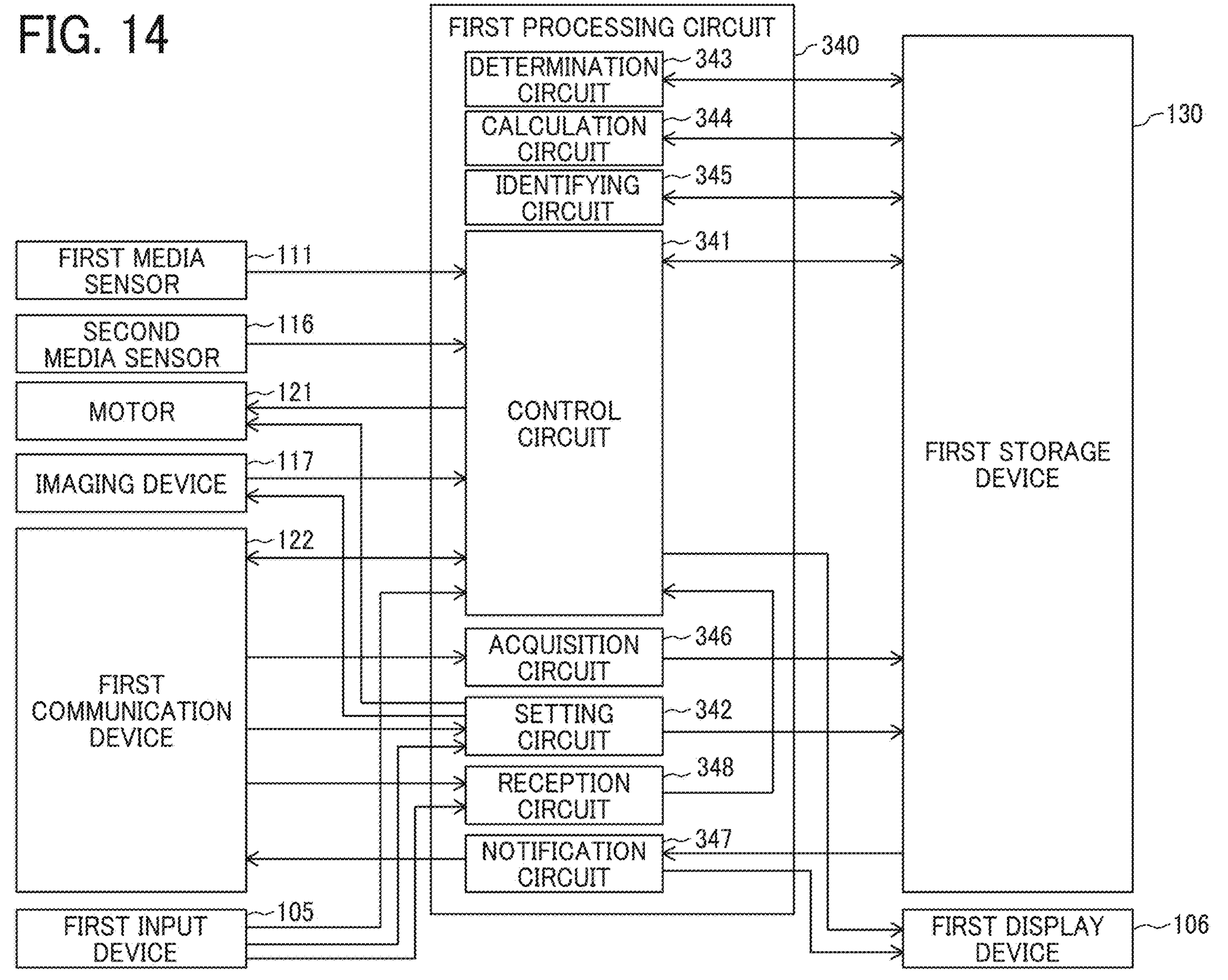
FIG. 14 is a block diagram illustrating a schematic configuration of a first processing circuit in a media conveying apparatus according to another embodiment.

FIG. 14 is a block diagram illustrating a schematic configuration of a first processing circuit 340 in a media conveying apparatus according to another embodiment.

The first processing circuit 340 is used in place of the first processing circuit 140 and executes media reading process and the like. The first processing circuit 340 includes a control circuit 341, a setting circuit 342, a determination circuit 343, a calculation circuit 344, a specification circuit 345, an acquisition circuit 346, a notification circuit 347, a reception circuit 348, and the like.

The control circuit 341 is one example of a control unit and functions like the control unit 141. The control circuit 341 receives the operation signal from the first input device 105 or the first communication device 122, the first instruction signal or the second instruction signal from the reception circuit 348, the first media signal from the first media sensor 111, and the second media signal from the second media sensor 116. Further, the control circuit 341 reads the first degree from the first storage device 130. The control circuit 341 controls the motor 121 based on the respective information received or read. The control circuit 341 acquires the input image from the imaging device 117, generates the processed image based on the input image, stores the processed image in the first storage device 130, and outputs the processed image to the first display device 106 or the first communication device 122.

The setting circuit 342 is one example of a setting unit and functions like the setting unit 142. The setting circuit 342 receives the setting information from the first input device 105 or the first communication device 122, stores the setting information in the first storage device 130, and sets the setting information to the imaging device 117 or the motor 121.

The determination circuit 343 is one example of a determination unit and functions like the determination unit 143. The determination circuit 343 reads the setting information and the input image from the first storage device 130, determinates whether the setting information is compatible with the medium imaged in the input image based on the input image, and stores the determination result in the first storage device 130.

The calculation circuit 344 is an example of a calculation unit and functions like the calculation unit 144. The calculation circuit 344 reads a determination result indicating whether the setting information is compatible with the medium imaged in the input image from the first storage device 130, calculates the first degree and the second degree based on the read information, and stores the first degree and the second degree in the first storage device 130.

The specification circuit 345 is an example of an identifying unit and functions like the identifying unit 145. The specification circuit 345 reads the input image from the first storage device 130, identifies the setting information compatible with the medium imaged in the input image, and stores the specification result in the first storage device 130. The specification circuit 345 reads the setting information and the capability information from the first storage device 130, identifies the media conveying apparatus or software that has the capability of being compatible with the media, and stores the specification result in the first storage device 130.

The acquisition circuit 346 is an example of an acquisition unit and functions like the acquisition unit 146. The acquisition circuit 346 receives the capability information from the first communication device 122 and stores the capability information in the first storage device 130.

The notification circuit 347 is an example of a notification unit and functions like the notification unit 147. The notification circuit 347 reads the first degree, the second degree, the determination result by determination circuit 343, and the specification result by specification circuit 345 from first storage device 130. The notification circuit 347 outputs the determination result by the determination circuit 343 and the specification result by the specification circuit 345 to the first display device 106 or the first communication device 122 based on the first degree and the second degree.

The reception circuit 348 is an example of a reception unit and functions like the reception unit 148. The reception circuit 348 receives the first instruction signal or the second instruction signal from the first input device 105 or the first communication device 122 and outputs the first instruction signal or the second instruction signal to the control circuit 341.

As detailed above, the media conveying apparatus increases the convenience for the user also when the first processing circuit 340 is used.

Figure 15:
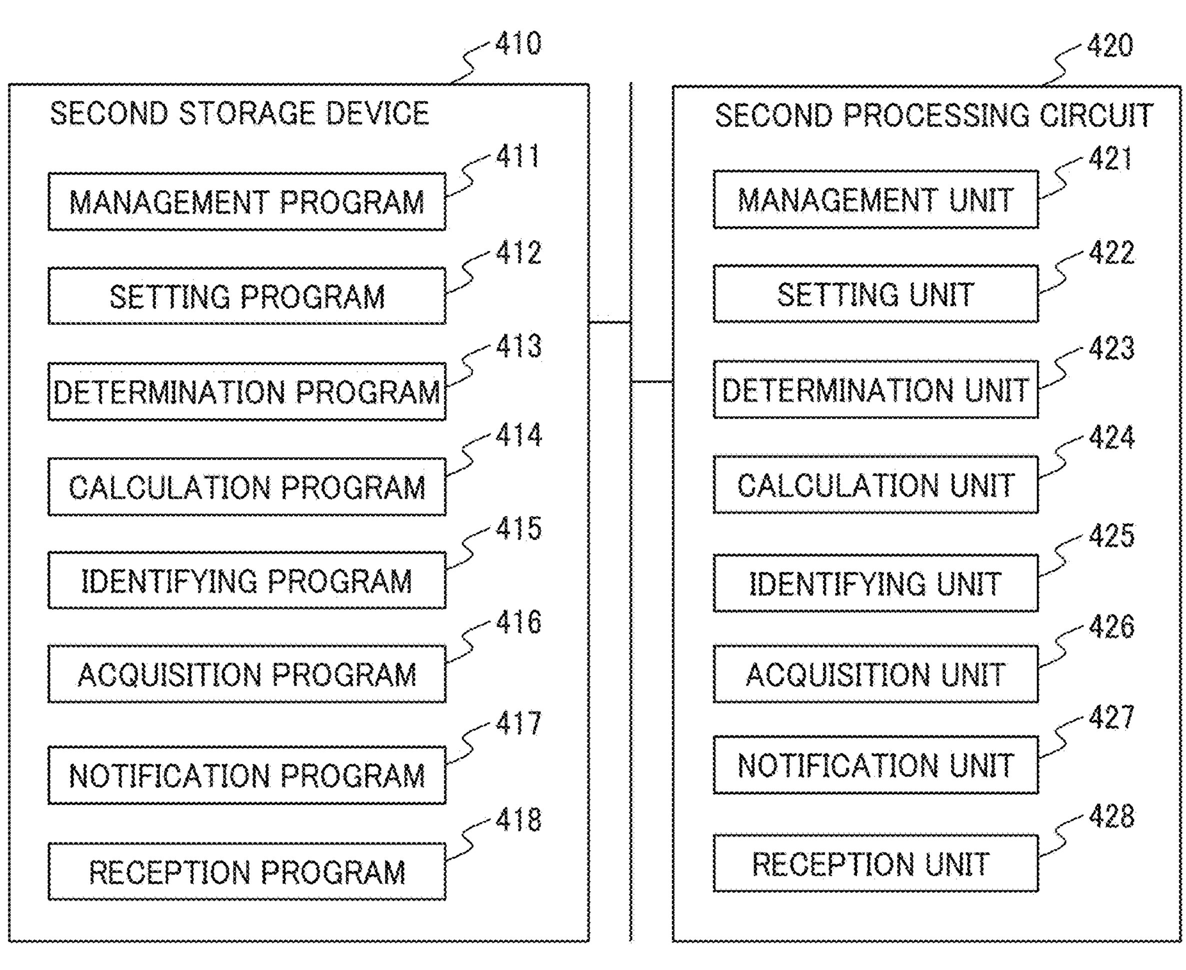
FIG. 15 is a diagram illustrating a schematic configuration of a second storage device and a second processing circuit according to still another embodiment.

FIG. 15 is a diagram illustrating a schematic configuration of a second storage device 410 and a second processing circuit 420 in an information processing apparatus according to still another embodiment.

As illustrated in FIG. 15, the second storage device 410 stores a management program 411, a setting program 412, a determination program 413, a calculation program 414, an identifying program 415, an acquisition program 416, a notification program 417, and a reception program 418. Each of these programs is a functional module implemented by software operating on a processor. The second processing circuit 420 reads each program stored in the first storage device 130 and operates according to each program read, thereby functioning as a management unit 421, a setting unit 422, a determination unit 423, a calculation unit 424, an identifying unit 425, an acquisition unit 426, a notification unit 427 and a reception unit 428. The setting unit 422, the determination unit 423, the calculation unit 424, the identifying unit 425, the acquisition unit 426, the notification unit 427, and the reception unit 428 have the same functions as the setting unit 142, the determination unit 143, the calculation unit 144, the identifying unit 145, the acquisition unit 146, the notification unit 147, and the reception unit 148 of the media conveying apparatus 100, respectively. The second storage device 410 stores each data stored by the first storage device 130.

In a case where the media reading process is executed in the present embodiment, in step S101, the management unit 421 stands by until a reading instruction to read the media is input by the user using the second input device 201 and an operation signal is received from the second input device 201. The management unit 421 transmits the received operation signal to the media conveying apparatus 100 via the second communication device 203.

In step S102, the setting unit 422 acquires the setting information included in the operation signal and sends a request signal to the media conveying apparatus 100 via the second communication device 203 requesting that the input image be generated according to each setting indicated in the acquired setting information. The setting unit 142 of the media conveying apparatus 100 receives the request signal from the information processing apparatus 200 via the first communication device 122 and sets the setting information to the imaging device 117, the motor 121, and the like so that the input image is generated according to each setting specified in the request signal. This allows the setting unit 422 to set the setting information designated by the user.

In step S107, the control unit 141 transmits the input image and the processed image to the information processing apparatus 200 via the first communication device 122. The management unit 421 receives the input image and the processed image from the media conveying apparatus 100 via the second communication device 203 and stores the input image and the processed image in the result table of the second storage device 410.

In step S109, the determination unit 423 determines, based on the input image, whether the setting information set by the user is compatible with the medium imaged in the input image, and in step S110, the determination unit 423 stores the determination result in the result table of the second storage device 210. In step S111, the calculation unit 424 refers to the result table to calculate the first degree, and transmits the first degree to the media conveying apparatus 100 via the second communication device 203. The calculation unit 144 of the media conveying apparatus 100 receives the first degree from the information processing apparatus 200 via the first communication device 122.

In steps S114 and S127, the identifying unit 425 identifies the setting information that is compatible with the medium for which the setting information is determined to be incompatible. In steps S115 and S128, the identifying unit 425 determines whether the setting information identified as the setting information compatible with the medium is supported by the media conveying apparatus 100. In steps S116 and S129, the acquisition unit 426 acquires capability information indicating the capabilities of other media conveying apparatuses or other software regarding imaging processing or image processing. In steps S117 and S130, the identifying unit 425 identifies the media conveying apparatus or the software that has the capability of being compatible with the medium for which the setting information is determined to be incompatible, from among other media conveying apparatuses or other software.

In step S118, the notification unit 427 generates the first notification data and outputs, to the user, the generated first notification data by displaying the generated first notification data on the second display device 202. As described above, in a case where the first degree satisfies the stop condition, the notification unit 427 outputs a proposal to change the setting information and re-image all the media. The notification unit 427 notifies the user of the specific information identified by the identifying unit 425 as the setting information that is compatible with the medium for which the setting information is determined to be incompatible. The notification unit 427 outputs information regarding a media conveying apparatus or software that has the capability of being compatible with the medium for which the setting information is determined to be incompatible, from among other media conveying apparatuses or other software.

In step S119, the reception unit 428 stands by until an instruction to re-convey and re-image the media, an instruction to continue the conveying and imaging of the media, or an instruction to end the conveying and imaging of the media is input by the user using the second input device 201 and the first instruction signal is received from the second input device 201. The reception unit 428 transmits the received first instruction signal to the media conveying apparatus 100 via the second communication device 203.

In step S125, the calculation unit 424 refers to the result table to calculate the second degree. The calculation unit 144 of the media conveying apparatus 100 receives the second degree from the information processing apparatus 200 via the first communication device 122.

In step S131, the notification unit 427 generates the second notification data and outputs, to the user, the generated second notification data by displaying the generated second notification data on the second display device 202. As described above, in a case where the second degree satisfies the notification condition, the notification unit 427 outputs a proposal to change the setting information and re-image the medium for which the setting information is determined to be incompatible, after the conveyance of all the media is completed.

In step S132, the reception unit 428 stands by until an instruction to re-convey and re-image the media and an instruction to end the conveying and imaging of the media is input by the user using the second input device 201 and the second instruction signal is received from the second input device 201. The reception unit 428 transmits the received second instruction signal to the media conveying apparatus 100 via the second communication device 203.

Some of the processes executed by each unit of the information processing apparatus described above may be executed by the corresponding unit of the media conveying apparatus.

As detailed above, the image processing system has made it possible to improve convenience for the user also when the information processing apparatus executes some of the media reading processes.

Figure 16:
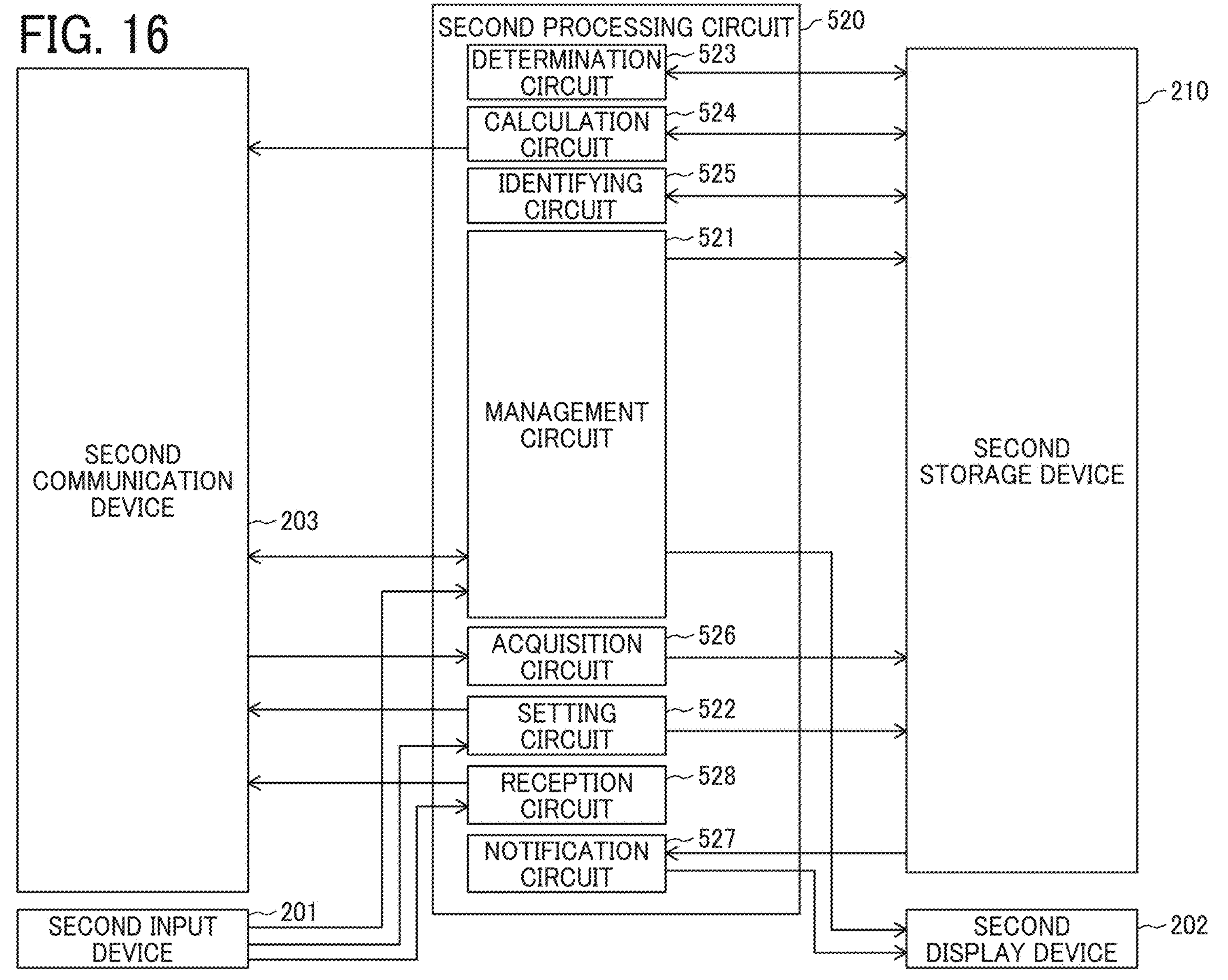
FIG. 16 is a block diagram illustrating a schematic configuration of another second processing circuit.

FIG. 16 is a block diagram illustrating a schematic configuration of a second processing circuit 520 in an information processing apparatus according to still another embodiment.

The second processing circuit 520 is used in place of the second processing circuit 420 and executes media reading process and the like. The second processing circuit 520 includes a management circuit 521, a setting circuit 522, a determination circuit 523, a calculation circuit 524, a specification circuit 525, an acquisition circuit 526, a notification circuit 527, a reception circuit 528, and the like.

The management circuit 521 is one example of a management unit and functions like the management unit 421. The management circuit 521 receives an operation signal from the second input device 201 and outputs the received operation signal to the second communication device 203. The management circuit 521 receives the input image and the processed image from the second communication device 203, stores the input image and the processed image in the second storage device 210, and outputs the input image and the processed image to the second display device 202.

The setting circuit 522 is one example of a setting unit and functions like the setting unit 422. The setting circuit 522 receives the setting information from the second input device 201, stores the setting information in the second storage device 210, and outputs the setting information to the second communication device 203.

The determination circuit 523 is one example of a determination unit and functions like the determination unit 423. The determination circuit 523 reads the setting information and the input image from the second storage device 210, determinates whether the setting information is compatible with the medium imaged in the input image based on the input image, and stores the determination result in the second storage device 210.

The calculation circuit 524 is an example of a calculation unit and functions like the calculation unit 424. The calculation circuit 524 reads a determination result indicating whether the setting information is compatible with the medium imaged in the input image from the second storage device 210, calculates the first degree and the second degree based on the read information, stores the first degree and the second degree in the second storage device 210, and outputs the first degree and the second degree to the second communication device 203.

The specification circuit 525 is an example of an identifying unit and functions like the identifying unit 425. The specification circuit 525 reads the input image from the second storage device 210, identifies the setting information compatible with the medium imaged in the input image, and stores the specification result in the second storage device 210. The specification circuit 525 reads the setting information and the capability information from the second storage device 210, identifies the media conveying apparatus or software that has the capability of being compatible with the media, and stores the specification result in the second storage device 210.

The acquisition circuit 526 is an example of an acquisition unit and functions like the acquisition unit 426. The acquisition circuit 526 receives the capability information from the second communication device 203 and stores the capability information in the second storage device 210.

The notification circuit 527 is an example of a notification unit and functions like the notification unit 427. The notification circuit 527 reads the first degree, the second degree, the determination result by determination circuit 523, and the specification result by specification circuit 525 from the second storage device 210, and outputs the determination result and/or the specification result to the second display device 202 based on the first degree or the second degree.

The reception circuit 528 is an example of a reception unit and functions like the reception unit 428. The reception circuit 528 receives the first instruction signal or the second instruction signal from the second input device 201 and outputs the first instruction signal or the second instruction signal to the second communication device 203.

As detailed above, the information processing apparatus has made it possible to improve convenience for the user also when the second processing circuit 520 is used.

Although the preferred embodiments have been described above, the embodiments are not limited thereto. For example, when the medium is re-conveyed and re-imaged, the control unit 141 may determine in step S107 of FIG. 9 whether the medium imaged in newly generated input image is identical to the medium imaged in the original input image. In that case, the control unit 141 calculates the degree of similarity between the newly generated input image and the original input image. The degree of similarity is, for example, normalized cross-correlation. When the degree of similarity is equal to or greater than the degree of similarity threshold, the control unit 141 determines that the two input image include an identical medium and sends the input image and the processed image to the information processing apparatus 200. By contrast, when the degree of similarity is less than the degree of similarity threshold, the control unit 141 determines that the medium is different between the two input images and outputs, to the user, a warning by displaying the warning on the first display device 106 or by transmitting the warning to the information processing apparatus 200 via the first communication device 122.

The determination unit 143 may determine whether the setting information is compatible with the medium imaged in the input image using only a portion of the input image (a portion of the top side), rather than using the entire input image. In that case, the determination unit 143 executes the determination process of step S109 when the control unit 141 acquires the input image for a predetermined number of lines from the imaging device 117. This allows the media conveying apparatus 100 to determine earlier whether the setting information is compatible with the medium imaged in the input image.

Further, the reception unit 148 may receive an instruction from the user whether to re-image each medium for each medium for which the setting information is determined to be incompatible. In this case, in the first notification data 1200 and/or the second notification data 1300, a button for specifying whether to re-image each medium is displayed for each medium for which the setting information is determined to be incompatible. In step S105 of FIG. 9, the control unit 141 determines whether the medium to be conveyed is a target of re-imaging based on not whether the determination result indicates incompatibility in the result table but whether an instruction to re-image is received by the user. Thus, the media conveying apparatus 100 can more reliably re-convey and re-image the media conveyed and imaged according to the inappropriate setting information. In this case, the media conveying apparatus 100 may prompt the user to reset only the medium that is a target of re-imaging on the receptacle 103 instead of prompting the user to reset all the media on the receptacle 103.

The control unit 141 identifies the media number of the re-conveyed media according to the order of the conveyed medium, and updates the corresponding input image and/or processed image.

The reception unit 148 may receive an instruction from the user whether to delete the input image and/or processed image from the first storage device 130 or the second storage device 210 in which the input image and/or processed image is stored that include the medium for which the setting information is determined to be incompatible. In this case, in the first notification data 1200 and/or the second notification data 1300, a button for specifying whether to delete the input image and/or processed image obtained by imaging each medium is displayed for each medium for which the setting information is determined to be incompatible. In the result table, the control unit 141 deletes the input image and/or processed image stored in association with the media number of the medium corresponding to the input image and/or processed image designated to be deleted. Further, the control unit 141 transmits a deletion request signal requesting deletion of the processed image to the information processing apparatus 200 via the first communication device 122. The deletion request signal includes a media number corresponding to the processed image to be deleted. In a case where the second processing circuit 220 of the information processing apparatus 200 receives the deletion request signal from the media conveying apparatus 100 via the second communication device 203, the second processing circuit 220 deletes the processed image associated with the media number included in the deletion request signal from the second storage device 210. This processing is advantageous when a medium not to be processed is mixed in the media conveyed collectively. This processing saves the user from having to find and delete the input image and/or the processed image of the medium not to be processed among the images of the media conveyed collectively. Therefore, the media conveying apparatus 100 can improve convenience for the user.

The media conveying apparatus may also have a so-called U-turn path, feeding and conveying media placed on the receptacle from the top side in sequence and discharging the media to the discharge table.

Any one of the above-described operations may be performed in various other ways, for example, in an order different from the one described above. The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In one aspect, a program for controlling a computer includes a plurality of program codes which, when executed by the computer, causes the computer to perform a method including:

setting setting information designated regarding an input image generation process;

determining, based on an input image, whether the setting information is compatible with a medium imaged in the input image, where the input image is generated by imaging each of the plurality of media sequentially conveyed according to the setting information;

calculating a degree of the number of media for which the setting information is determined to be incompatible among the plurality of media;

stopping conveying subsequent media when the degree is greater than a threshold; and output information on a result of determining whether the setting information is compatible with the medium imaged in the input image when the degree is greater than the

The invention claimed is:

1. A media conveying apparatus comprising:

circuitry configured to set setting information regarding an input image generation process;

a conveyor to convey a plurality of media sequentially; and an imager to image each of the plurality of media sequentially conveyed by the conveyor according to the setting information to obtain an input image;

wherein the circuitry is further configured to:

determine, based on the input image, whether the setting information is compatible with the medium imaged in the input image; and calculate a degree of the number of media for which the setting information is determined to be incompatible among the plurality of media, and wherein, when the degree is greater than a threshold, the circuitry is configured to stop conveying subsequent media and output information on a result of determining whether the setting information is compatible with the medium imaged in the input image.

2. The media conveying apparatus according to claim 1, wherein the circuitry is configured to calculate, as the degree, a ratio of media for which the setting information is determined to be incompatible in a predetermined number of media out of the plurality of media, or the number of media for which the setting information is determined to be incompatible in the predetermined number of media out of the plurality of media.

3. The media conveying apparatus according to claim 1, wherein the circuitry is configured to output a proposal to change the setting information and re-image all of the plurality of media as the information on the result of determining.

4. The media conveying apparatus according to claim 1, wherein, when the degree is equal to or less than the threshold, the circuitry is configured to output a proposal to change the setting information and re-image the medium for which the setting information is determined to be incompatible after conveying all the plurality of media is completed.

5. The media conveying apparatus according to claim 4, wherein, when all the plurality of media is re-conveyed, the circuitry is configured to control the imager to re-image only the medium for which the setting information is determined to be incompatible.

6. The media conveying apparatus according to claim 1, wherein the circuitry is further configured to:

acquire capability information indicating respective capabilities of at least one of other media conveying apparatuses or other software, the capability information being of an input image generation process; and output information on a media conveying apparatus or software that has a capability compatible with the medium for which the setting information is determined to be incompatible, from among the other media conveying apparatuses or the other software of which the capability information has been obtained.

7. An image processing system including a media conveying apparatus and an information processing apparatus, the system comprising:

circuitry configured to set setting information regarding an input image generation process;

a conveyor to convey a plurality of media sequentially; and an imager to image each of the plurality of media sequentially conveyed by the conveyor according to the setting information to obtain an input image, wherein the circuitry is further configured to:

determine, based on the input image, whether the setting information is compatible with the medium imaged in the input image; and calculate a degree of the number of media for which the setting information is determined to be incompatible among the plurality of media, and wherein, when the degree is greater than a threshold, the circuitry is configured to stop conveying subsequent media and output information on a result of determining whether the setting information is compatible with the medium imaged in the input image.

8. A media conveying method comprising:

setting setting information regarding an input image generation process;

conveying a plurality of media sequentially by a conveyor;

imaging, with an imager, each of the plurality of media sequentially conveyed according to the setting information to obtain an input image;

determining, based on the input image, whether the setting information is compatible with the medium imaged in the input image;

calculating a degree of the number of media for which the setting information is determined to be incompatible among the plurality of media;

stopping conveying subsequent media when the degree is greater than a threshold; and outputting information on a result of determining whether the setting information is compatible with the medium imaged in the input image when the degree is greater than the threshold.

* * * * *